(12) United States Patent
Yamawaki et al.

(10) Patent No.: US 8,042,818 B2
(45) Date of Patent: Oct. 25, 2011

(54) ELECTRIC DAMPER

(75) Inventors: Shigeru Yamawaki, Saitama (JP); Yasuo Shimizu, Saitama (JP); Katsuji Watanabe, Saitama (JP); Atsuhiko Yoneda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 350 days.

(21) Appl. No.: 12/397,006

(22) Filed: Mar. 3, 2009

(65) Prior Publication Data

US 2009/0224502 A1  Sep. 10, 2009

(30) Foreign Application Priority Data

Mar. 4, 2008 (JP) ................................ 2008-053172

(51) Int. Cl.
*B60G 17/00* (2006.01)
*F16F 9/50* (2006.01)
(52) U.S. Cl. .................... 280/5.515; 701/37; 188/266.1
(58) Field of Classification Search ................. 280/5.51, 280/5.515, 5.519; 267/140.15; 188/322.15; 701/37
See application file for complete search history.

(56) References Cited

U.S. PATENT DOCUMENTS

| 5,269,557 | A | 12/1993 | Butsuen et al. |
| 5,301,111 | A | 4/1994 | Utsui et al. |
| 5,701,245 | A * | 12/1997 | Ogawa et al. ................. 701/37 |
| 6,247,685 | B1 | 6/2001 | Takahashi |
| 6,633,803 | B1 | 10/2003 | Shal et al. |
| 6,859,702 | B2 * | 2/2005 | Kawashima et al. .......... 701/37 |
| 7,226,082 | B2 * | 6/2007 | Muramatsu et al. .......... 280/775 |
| 7,269,485 | B2 * | 9/2007 | Oikawa et al. ................... 701/1 |
| 2009/0273147 | A1 * | 11/2009 | Inoue et al. .................. 280/5.51 |

FOREIGN PATENT DOCUMENTS

| EP | 0 562 653 A1 | 9/1993 |
| JP | 02-003509 A | 1/1990 |
| JP | 6-35701 U | 5/1994 |
| JP | 2004-161073 A | 6/2004 |
| JP | 2005-256921 A | 9/2005 |
| JP | 2007-168685 A | 7/2007 |
| JP | 2007-276571 A | 10/2007 |
| WO | WO 2007/049633 A1 | 5/2007 |

OTHER PUBLICATIONS

Machine Translation of Inoue et al. JP 2007168685 A (which was cited by Applicant in Feb. 4, 2010 IDS).*

* cited by examiner

*Primary Examiner* — Paul N Dickson
*Assistant Examiner* — Joseph Rocca
(74) *Attorney, Agent, or Firm* — Arent Fox LLP

(57) ABSTRACT

An electric damper which does not transmit unbalance wheel vibration to a vehicle body is provided. A low-pass cutoff frequency setting unit and a high-pass cutoff frequency setting unit respectively set the cutoff frequencies for band-stop filters to a frequency band corresponding to unbalance wheel vibration based on a signal indicating a vehicle speed from a vehicle speed sensor, and a function as a band-stop filter comprising a low-pass filter computation unit, a high-pass filter computation unit and an adder is computed for a displacement rate of the vertical motion of a wheel calculated by a differentiating unit in a damper control unit. A damper control amount computation unit calculates a control amount of controlling an electric motor for a motor-driven damper based on the calculated filtered displacement rate, and outputs a control signal to a motor driving unit through a driving circuit output unit.

5 Claims, 23 Drawing Sheets

ELONGATION REGENERATIVE ELECTRIC GENERATION

SHRINKAGE REGENERATIVE ELECTRIC GENERATION

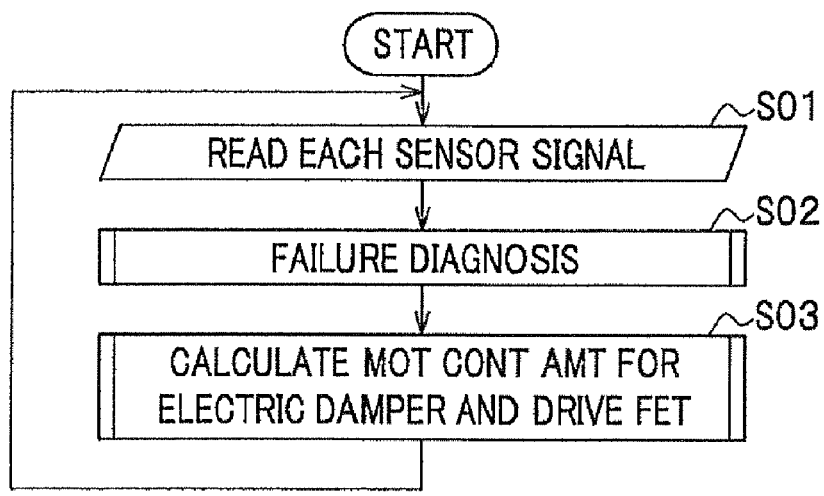
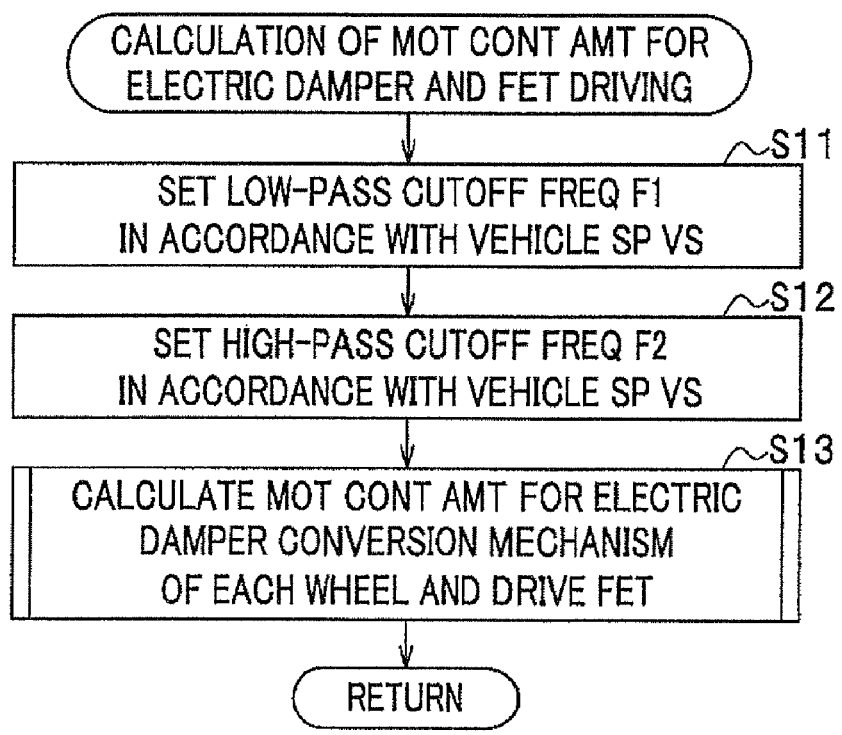

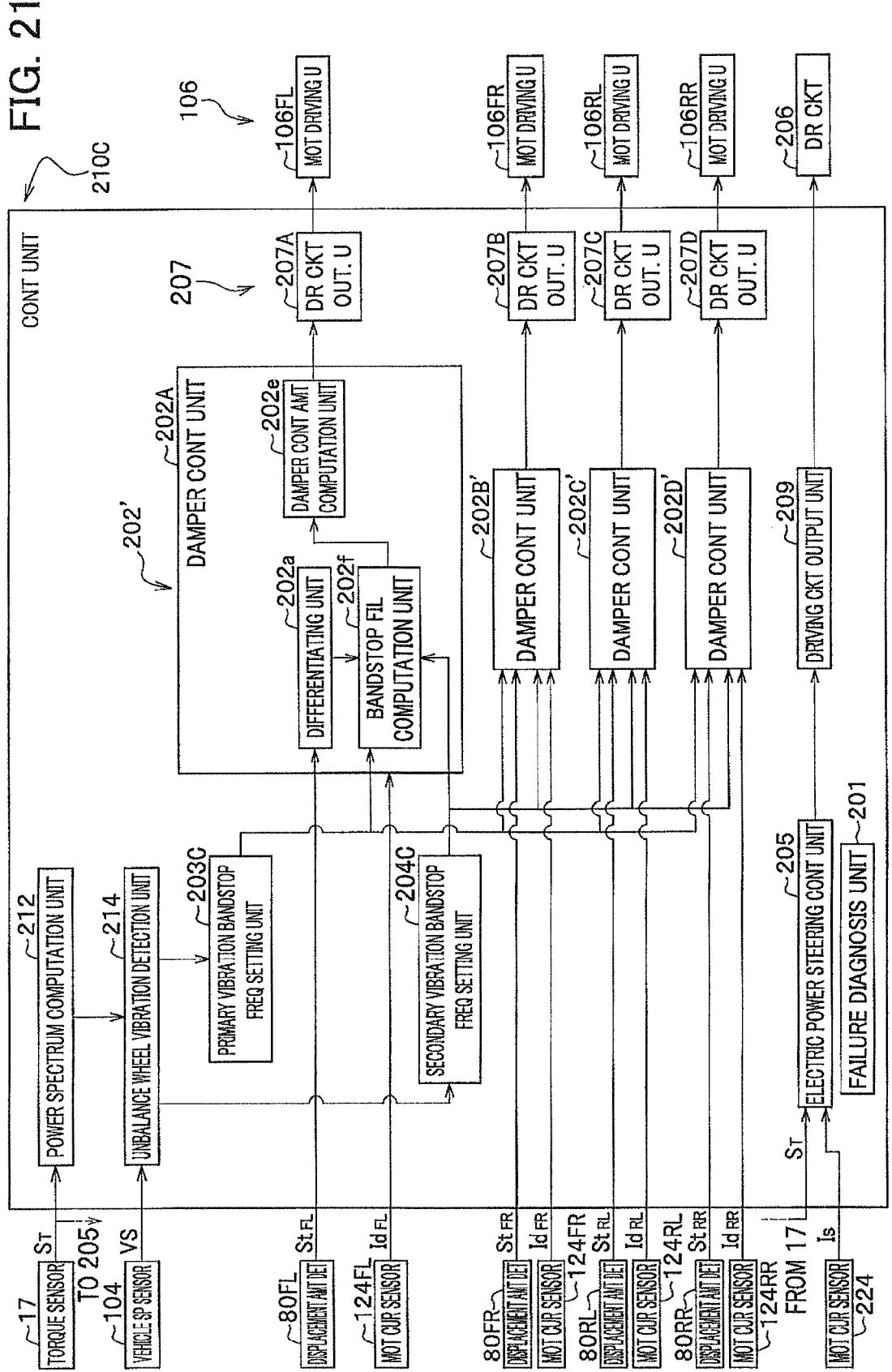

ELECTRIC DAMPER

CROSS REFERENCE TO RELATED APPLICATIONS

This application claims the foreign priority benefit under Title 35, United States Code, §119(a)-(d) of Japanese Patent Application No. 2008-053172, filed on Mar. 4, 2008 in the Japan Patent Office, the disclosure of which is herein incorporated by reference in its entirety.

BACKGROUND OF THE INVENTION

1. Field of the Invention

The present invention relates to an electric damper for a vehicle suspension device.

2. Description of the Related Art

JP 2007-276571 A discloses a technology relating to an electric damper (motor-driven damper device) for a vehicle suspension device having a rack and pinion mechanism. Moreover, JP 2005-256921A discloses a technology of detecting a vertical acceleration parts on the spring of a vehicle using an acceleration sensor provided right above each wheel to detect the vertical acceleration, acquiring the power spectrum distribution of the vertical acceleration, reading out a power spectrum in a frequency region relating to goodness/poorness of the ride comfort, and changing the cutoff frequency of a low-pass filter in accordance with the sum of the spectra, thereby controlling the damper characteristic.

According to JP 2005-256921A, however, if the electric damper is set to have a characteristic with a high damping force, i.e., a characteristic for a sporty vehicle that a ride comfort is hard, wheel vibrations (hereinafter, "unbalance wheel vibration") caused due to the unbalance of a wheel are transmitted to a vehicle body on the spring, so that a driver feels uncomfortable vibrations.

It is possible to reduce transmission of the unbalance wheel vibration to the vehicle body by setting the damping force in a high frequency region low. However, setting the damping force to vertical vibration of a wheel low is not desirable since vehicles having a ride comfort set to a hard characteristic are generally sporty vehicles, and the ride comfort is set hard to drive the vehicle with the driving characteristic being emphasized while acquiring road-surface information from vibrations from a road surface. Because the unbalance wheel vibration is not good for transmitting road-surface information, but the unbalance wheel vibration obscures road-surface information, so that the unbalance wheel vibration is not desirable for sporty vehicles.

The present invention is made to overcome the foregoing problem, and it is an object to provide an electric damper that does not transmit unbalance wheel vibration to a vehicle body to realize comfort driving.

SUMMARY OF THE INVENTION

A first aspect of the present invention provides an electric damper comprising: a conversion unit that converts a vertical motion of a wheel into a rotation of an electric motor; a wheel vertical motion detector that detects a vertical motion of the wheel; and a damping unit that controls the electric motor based on a signal from the wheel vertical motion detector to damp a vertical motion of the wheel, wherein the damping unit sets a frequency region of the damped vertical motion variable or a damping force to the vertical motion of the wheel in that frequency region variable, in accordance with a vehicle speed.

According to the first aspect of the present invention, in order to suppress any transmission of unbalance wheel vibration changing in accordance with a vehicle speed as vertical vibration of a wheel to a vehicle body, a frequency region of damping the vertical motion of the wheel and the damping force to the vertical motion of the wheel in the frequency region can be variably set in accordance with the vehicle speed.

A second aspect of the present invention provides an electric damper comprising: a conversion unit that converts a vertical motion of a wheel into a rotation of an electric motor; a wheel vertical motion detector that detects a vertical motion of the wheel; and a damping unit that controls the electric motor based on a signal from the wheel vertical motion detector to change damping force to vibration of a vertical motion of the wheel in a predetermined frequency band, wherein the damping unit sets the predetermined frequency band, changing the damping force, movable or the damping force to a vertical motion of the wheel in the predetermined frequency band variable, in accordance with a vehicle speed.

According to the second aspect of the present invention, in order to suppress any transmission of unbalance wheel vibration changing in accordance with a vehicle speed as the vertical vibration of a wheel to a vehicle body, it is possible to movably set a frequency region for weakening the damping force to the vertical motion of the wheel in accordance with the vehicle speed and to set the damping force to the vertical motion of the wheel in a frequency region variable in accordance with the vehicle speed.

A third aspect of the present invention provides the electric damper according to the second aspect, wherein the electric damper is mounted on a vehicle including an electric power steering device including a steering wheel torque sensor; and wherein the damping unit detects a magnitude of vibration corresponding to the predetermined frequency band based on a steering wheel torque detection signal from the steering wheel torque sensor, and changes the damping force based on the detected magnitude.

According to the third aspect of the present invention, unbalance wheel vibration can be detected as the vibration of a steering wheel torque detection signal of an electric power steering device, and the damping force to the vertical motion of the wheel in a predetermined detected frequency region can be set weaker and weaker as the magnitude of vibration becomes large based on the magnitude of the vibration corresponding to the predetermined frequency region, thereby suppressing any transmission of the unbalance wheel vibration.

A fourth aspect of the present invention provides the electric damper according to the second aspect, wherein the electric damper is mounted on a vehicle including an electric power steering device including a steering wheel torque sensor; and wherein the damping unit detects a frequency of a vibration component originating from unbalancing of the wheel based on a steering wheel torque detection signal from the steering wheel torque sensor, and changes the damping force based on the detected frequency.

According to the fourth aspect of the present invention, unbalance wheel vibration can be detected as the vibration of a steering wheel torque detection signal of an electric power steering device, and based on the detected frequency, the damping force to the vertical motion of a wheel in that frequency can be changed.

A fifth aspect of the present invention provides the electric damper according to the second aspect, wherein the electric damper is mounted on a vehicle including an electric power steering device including a steering wheel torque sensor; the electric damper further comprising: a power spectrum computation unit that computes a power spectrum of a steering wheel torque detection signal from the steering wheel torque sensor of the electric power steering device; and an unbalance wheel vibration frequency acquiring unit that acquires a frequency of a vibration component caused by unbalance in the wheel, and a magnitude of the vibration in accordance with a vehicle speed from computation results of the power spectrum computation unit; and the damping unit sets the predetermined frequency band based on the frequency of the vibration component acquired by the unbalance wheel vibration frequency acquiring unit, and changes the damping force in the predetermined frequency band based on the magnitude of the vibration component originating from unbalancing of the wheel.

According to the fifth aspect of the present invention, a power spectrum computation unit computes the frequency distribution of the magnitude of vibration based on a steering wheel torque detection signal of an electric power steering device, it is possible to extract the frequency of the vibration component due to unbalance of a wheel according to a vehicle speed, and to acquire the magnitude of the vibration. Accordingly, based on the frequency extracted by the unbalance wheel vibration frequency acquiring unit and the magnitude of the vibration, it is possible to weaken the damping force to the vertical motion of the wheel in that frequency.

According to the present invention, it is possible to provide an electric damper that does not transmit unbalance wheel vibration to a vehicle body to realize comfort driving.

BRIEF DESCRIPTION OF THE DRAWINGS

The object and features of the present invention will become more readily apparent from the following detailed description taken in conjunction with the accompanying drawings in which:

FIGS. 7A and 7B are diagrams for explaining control conditions of four FETs in the H-bridge circuit for a damper, wherein FIG. 7A is a diagram for explaining the control condition of each FET in a case of regenerative electric generation at an elongation side, and FIG. 7B is a diagram for explaining the control condition of each FET in a case of regenerative electric generation at a shrinkage side;

FIG. 9 is a main flowchart of the entire control in the electric damper;

FIG. 10 is a main flowchart for calculation of a motor control amount and controlling of an FET driving in a motor-driven damper;

FIG. 21 is a control-function block diagram showing an electric damper according to the third embodiment of the present invention;

The same or corresponding elements or parts are designated with like references throughout the drawings.

DETAILED DESCRIPTION OF THE INVENTION

With reference to accompanying drawings will be described a first embodiment of the present invention.

First Embodiment

Figure 1:
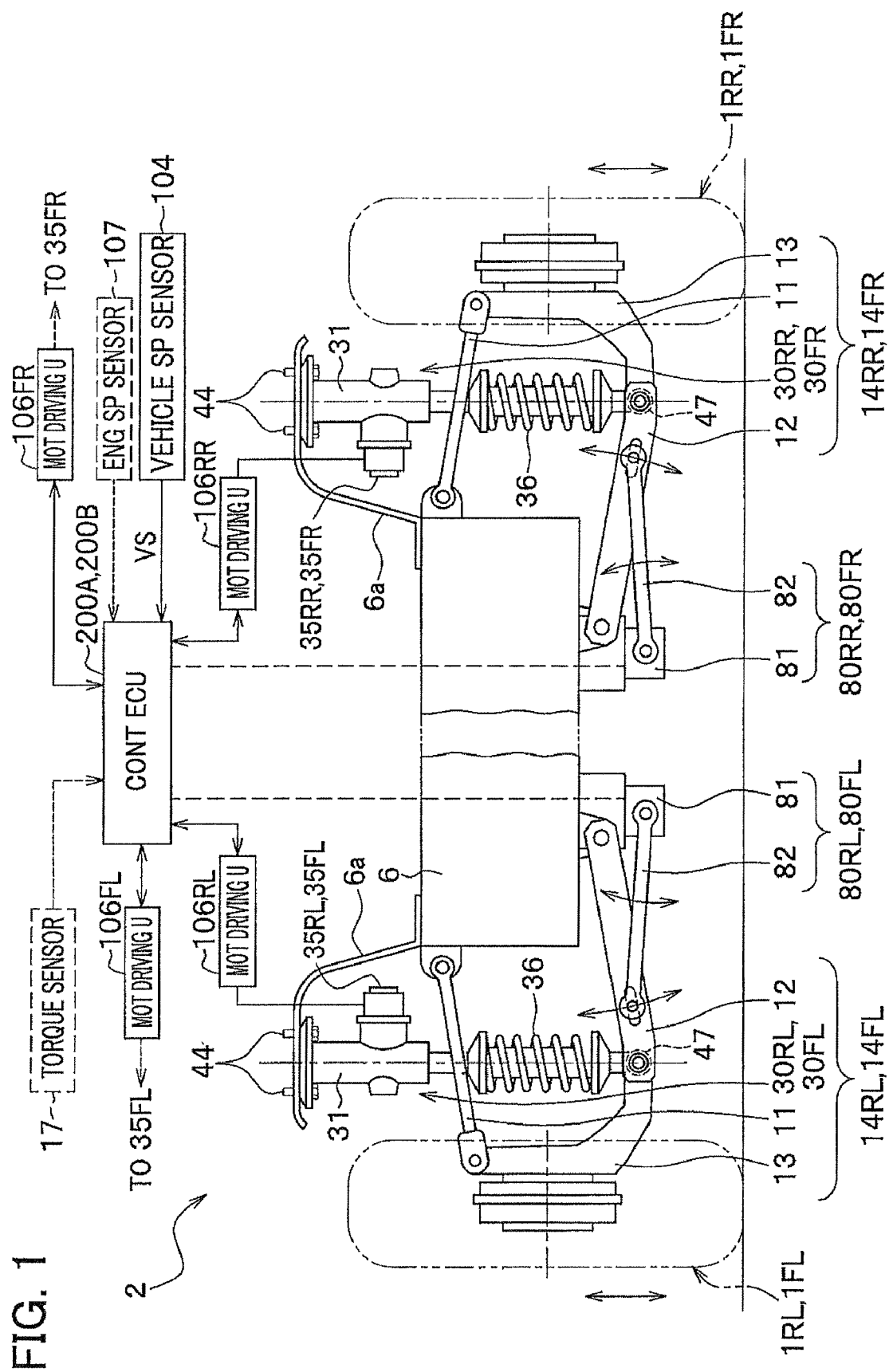
FIG. 1 is an exemplary diagram showing a vehicle having a vehicle suspension device equipped with an electric damper according to a first embodiment of the present invention as viewed from the back.
Figure 2:
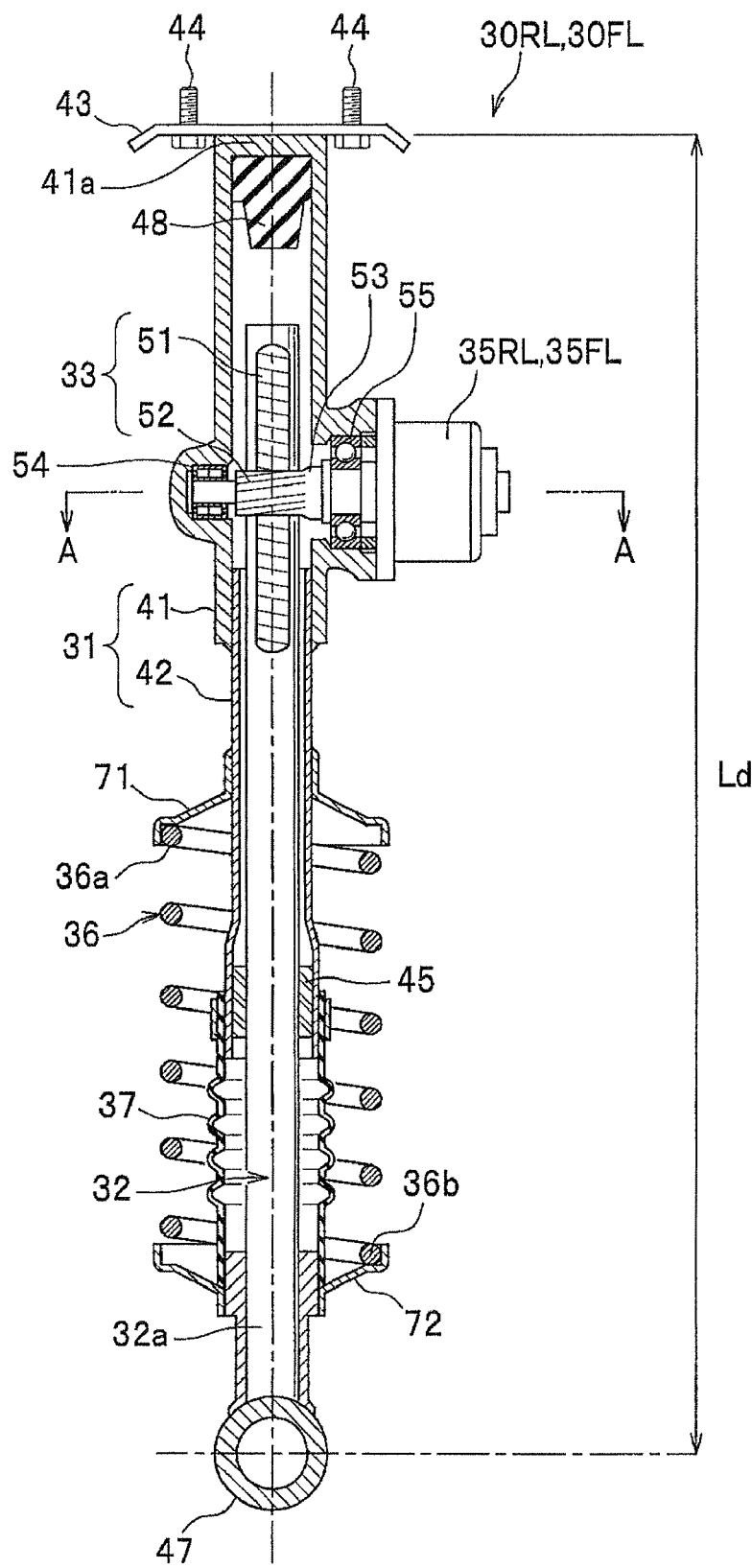
FIG. 2 is a cross-sectional view showing an electric damper conversion mechanism of the electric damper.
Figure 3:
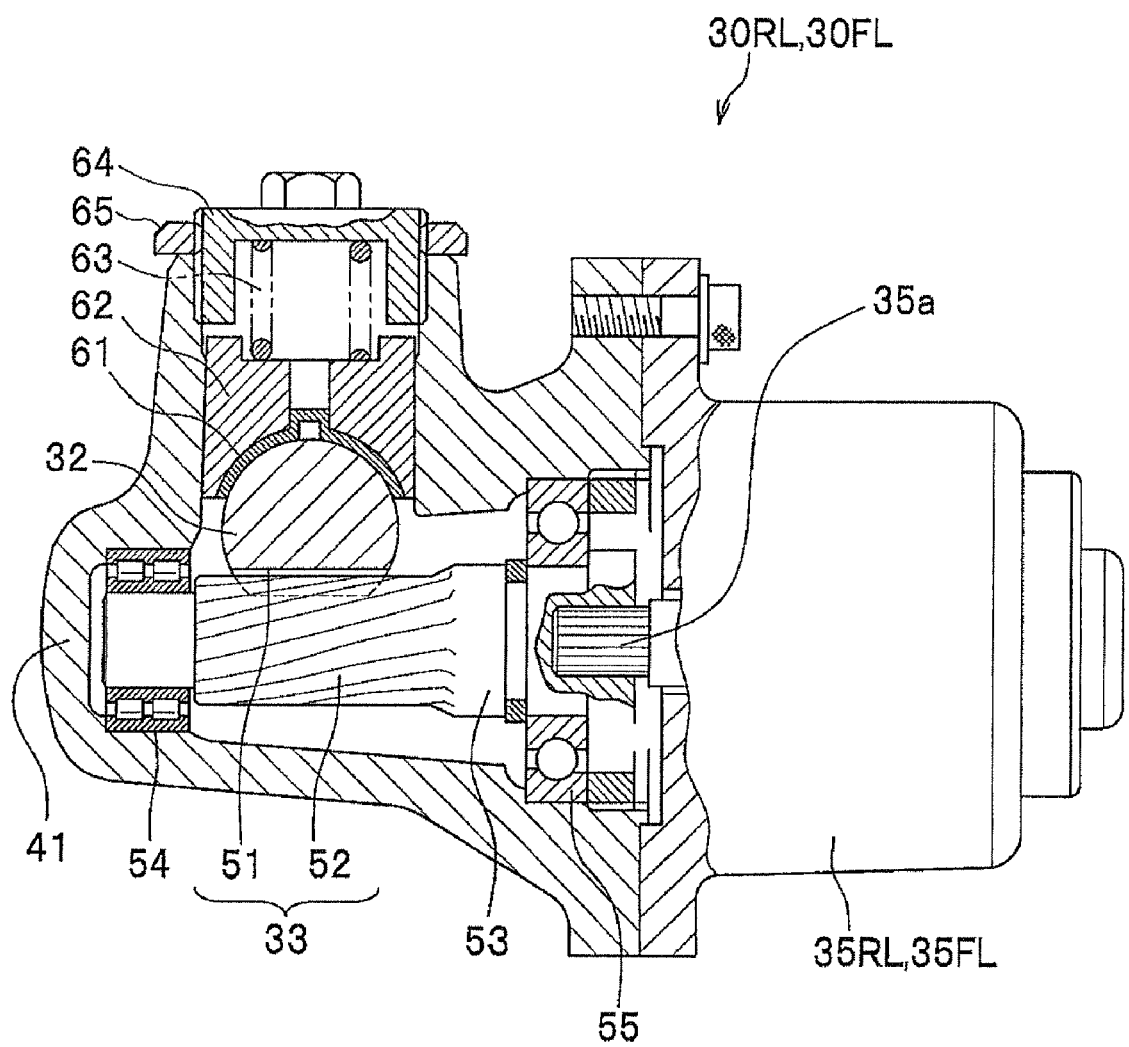
FIG. 3 is a partial cross-sectional view along a line A-A in FIG. 2.

With reference to FIGS. 1 to 3, and also FIG. 5 will be described major components of an electric damper (motor-driven damper device) of the embodiment.

In the embodiment, an explanation will be given of an example case where all suspension devices 14FL, 14FR, 14RL, and 14 RR of right and left front wheels 1FL, 1FR and right and left rear wheels 1RL and 1RR have respective electric damper conversion mechanisms 30FL, 30FR, 30RL, and 30RR of electric dampers (motor-driven damper devices) 303 (see FIG. 5, denoted as 303FL, 303FR, 303RL, 303RR in the figure).

FIG. 1 is an exemplary diagram showing a vehicle having a vehicle suspension device equipped with an electric damper as viewed from the back. FIG. 2 is a cross-sectional view showing an electric damper conversion mechanism of an electric damper. FIG. 3 is a partial cross-sectional view along a line A-A in FIG. 2.

FIG. 1 shows a rear suspension, but since a front suspension generally has the same structure as that of the rear suspension except a wheel support member 13 replaced with a steering knuckle, FIG. 1 indirectly shows the front suspension. In FIG. 1, a reference number for a front suspension is indicated also. Regarding the structures of the right and left front wheels, letters FL which indicate a left front wheel and letters FR which indicates a right front wheel are put after a reference number to distinguish those in explanation, and a wheel is not simply denoted as a wheel 1, but is denoted as, for example, a wheel 1FL or 1FR. Also, regarding the structures of the right and left rear wheels, letters RL which indicates a left rear wheel and letters RR which indicates a right rear wheel are put after a reference number, and a wheel is not simply denoted as a wheel 1, but is denoted as, for example, a wheel 1RL or 1RR. The same is true for a suspension device 14 of each wheel 1 and the structural component thereof.

Accordingly, an explanation will be representatively given of only the portions of a wheel 1RL, except any particular cases.

As shown in FIG. 1, an electric damper conversion mechanism (conversion mechanism) 30RL is incorporated in the suspension device 14RL which is provided at a wheel 1RL. Each electric damper conversion mechanism 30RL has an electric motor 35RL controlled by a control ECU (Electric Control Unit) 200A through a motor driving unit (MOT DR U) 106RL. The suspension device 14RL is provided with a displacement amount detector (wheel-vertical-movement detector) 80RL which detects the vertical displacement of the wheel 1RL, and the output signal of the sensor is input into the control ECU 200A.

Moreover, a signal indicating a vehicle speed VS is input into the control ECU 200A from a vehicle speed sensor 104. Note that a signal indicating an engine speed may be input into the control ECU 200A from an engine speed sensor 107.

The detail of the structure of the electric damper conversion mechanism 30RL will be discussed later with reference to FIGS. 2 and 3.

[Suspension Device]

As shown in FIG. 1, a vehicle body 6 of a vehicle 2 is provided with pairs of right and left, front and rear vehicle suspension devices (hereinafter, simply called "suspension device") 14FL and 14FR, and, 14RL and 14RR. The vehicle body 6 has suspension attaching portions 6a, 6a, 6a, 6a at the right and left, front and rear upper portions. The suspension devices 14FL, 14FR, 14RL and 14RR are used as the front suspensions or the rear suspensions of the vehicle 2, and the vehicle body 6 has right and left front and rear wheels 1FL, 1FR, 1RL and 1RR.

The left suspension device 14RL is a double wishbone type suspension or a multi-link type suspension comprising, for example, an upper arm 11 at an upper side, a lower arm 12 at a lower side, the wheel supporting member 13, and the electric damper conversion mechanism 30RL.

The upper arm 11 and the lower arm 12 are linked to the side portion of the vehicle body 6 in such a manner as to be able to swing in the vertical direction. The wheel supporting member 13 comprises a knuckle for rotationally supporting the wheel 1RL, and is lined to the leading end of the upper arm 11 and the leading end of the lower arm 12 in such a manner as to be able to swing in the vertical direction. The left electric damper conversion mechanism 30RL has the electric motor 35RL at the upper portion, and is hanged between the suspension attaching portion 6a of the vehicle body 6 and the lower portion of the wheel supporting member 13, and, damps vibration in the vertical direction acting on the wheel 1RL using the electric motor 35RL.

As shown in FIG. 1, the left electric damper conversion mechanism 30RL has the displacement amount detector (DMD) 80RL which detects a displacement amount $S_r$ (not shown) when the wheel 1RL moves in the vertical direction relative to the vehicle body 6.

The left suspension device 14FL and the electric damper conversion mechanism 30FL thereof have the same structures as those of the left suspension device 14RL and the electric damper conversion mechanism 30RL, and the right suspension device 14RR (14FR) and the electric damper conversion mechanism 30RR (30FR) have the same symmetrical structures as those of the left suspension device 14RL (14FL) and the electric damper conversion mechanism 30RL (30FL), so that the explanation thereof will be omitted.

[Coil Spring]

As shown in FIG. 1, a coil spring is a shock absorber which supports the vehicle-body weight acting on the wheel 1RL, and absorbs vibrations and shocks in the vertical direction. As shown in FIG. 2, the coil spring 36 is disposed at the lower portion of the electric damper conversion mechanism 30RL, and is disposed at a position apart from the electric motor 35RL in the downward direction through a rod 32 in a manner as to be coaxial with the rod 32, i.e., as to house a rod 42 of a damper housing 31 to be discussed later inwardly of the internal-diameter direction of the coil spring 36. An upper end 36a of the coil spring 36 is received by a spring seat 71 (see FIG. 2) fixed at the upper portion of the rod 42, and a bottom end 36b is received by a spring seat 72 (see FIG. 2) fixed at the bottom portion of the rod 32, respectively. As the coil spring 36 intervenes between the spring seat 71 and the spring seat 72, the coil spring 36 urges the rod 42 and the rod 32 of the damper housing 31 in the vertical direction and in a direction becoming apart from each other.

As shown in FIG. 2, a dust boot 37 which covers the open end of the rod 42 and the rod 32 protruding downwardly from the open end is telescopically provided in the axial direction of the rod 32. The dust boot 37 seals the interior of the damper housing 31 from the exterior thereof, and seals the opening of the damper housing 31 so as to prevent any foreign materials like dusts, rain water and water from a road surface from entering thereinside.

Next, the detail of the structure of the electric damper conversion mechanism 30RL will be explained with reference to FIGS. 2 and 3, and also FIG. 1 accordingly.

[Electric Damper Conversion Mechanism]

As shown in FIG. 2, the electric damper conversion mechanism 30RL generally comprises the damper housing 31, the rod 32, a rack and pinion mechanism 33, and the electric motor 35RL.

The rack and pinion mechanism 33 in the embodiment corresponds to a conversion mechanism recited in claims.

The damper housing 31 shown in FIG. 2 is a substantially cylindrical member extending in the vertical direction, and has a rack-pinion member 41 and the rod 42. The rack-pinion member 41 and the rod 42 are disposed so as to be coaxial with each other, one end portions thereof are subjected to press fitting or welding to be connected together, so that the respective hollows are coaxially communicated with each other. The upper end portion of the rack-pinion member 41 has an end surface 41a, has a dish-like insulator 43 and attachment bolts 44, and is fixed to the suspension attaching portion 6a (see FIG. 1) by the attachment bolts 44. The lower end of the rod 42 of the damper housing 31 is free.

As shown in FIG. 2, the rod 32 comprises a long thin round bar coaxially disposed with the damper housing 31, is housed in the damper housing 31, and is supported by the rack and pinion mechanism 33, housed in the rack-pinion member 41, and a slide bearing 45, disposed inside the rod 42, in such a manner as to be slidable in the vertical direction. The rod 32 has a lower end 32a which has an annular connecting portion 47 extending downwardly from the lower end opening of the rod 42 of the damper housing 31, and connected to the bottom portion of the wheel support member 13 in such a manner as to be able to swing.

Note that the connecting portion 47 may be connected to the lower arm 12 in such a manner as to be able to swing.

A bump stopper 48 formed of an elastic material like rubber is fixed to the end surface 41a of the rack-pinion member 41, and absorbs shock with its elasticity when the upper end surface of the rod 32 bumps against the bump stopper 48.

[Rack and Pinion Mechanism]

As shown in FIG. 3, a motor shaft 35a is attached to the upper portion of the electric damper conversion mechanism 30RL in such a manner as to be substantially orthogonal to the axial direction of a rack gear 51 provided on the upper outer circumference surface of the rod 32. The motor shaft 35a is coupled to a pinion shaft 53. A pinion gear 52 provided on the pinion shaft 53 and the rack gear 51 are engaged with each other, thereby forming the rack and pinion mechanism 33. The rack and pinion mechanism 33 is housed inside the rack-pinion member 41, and both ends of the pinion shaft 53 are rotatably supported by bearings 54, 55, respectively, fixed to the rack-pinion member 41.

The electric motor 35RL is fixed to the rack-pinion member 41 through a flange.

The rack and pinion mechanism 33 receives significant power from the electric motor 35RL and, when the wheel 1RL rapidly moves in the vertical direction, rapidly converts the vertical movement into rotational motion. Even in such a case, it is necessary to surely maintain the engagement of the rack gear 51 and the pinion gear 52. Accordingly, each gear tooth width of the rack gear 51 and the pinion gear 52 is set large.

As shown in FIG. 3, a rod guide 62 pushes the back face of the rod 32 provided with the rack gear 51 through a sliding member 61, and the rack gear 51 is pushed against the pinion gear 52. The rack gear 51 is pressed in the direction of the pinion gear 52 by a compression coil spring 63 which has an adjusted urging force by an adjustment bolt 64 and which pushes the rod guide 62.

The rod guide 62 supports the rod 32 from the back face side of the rack gear 51, and guides the rod 32 in such a manner as to be slidable in an axial direction. The sliding member 61 is present between the rod 32 and the rod guide 62, directly contacts the outer circumference surface of the rod 32 at the rear face side of the rack gear 51, and reduces a slide resistance. The sliding member 61 is formed of a material having a high abrasion resistance and a small frictional resistance. A rock nut 65 is for suppressing any loosening of the adjustment bolt 64 after the adjustment bolt 64 is set and positioned.

As explained above, as the rod guide 62 pushes the rack gear 51 in the direction of the pinion gear 52, the play (backlash) of the engagement of the rack gear 51 and the pinion gear 52 can be set to zero or to the minimum, so that even if the vertical movement of the rod 32 is a slight vibration, it is possible to surely convert such vertical movement into rotation of the pinion gear 52. This allows the electric motor 35RL to efficiently generate damping force.

[Electric Motor]

The electric motor 35RL comprises, for example, a DC motor with a brush, and is attached to the flange portion of the rack-pinion member 41. The motor shaft 35a of the electric motor 35RL and the pinion shaft 53 may be coupled by, for example, coupling through serration as shown in FIG. 3, or may be elastically coupled by non-illustrated coupling scheme.

[Displacement Amount Detector]

Figure 4:
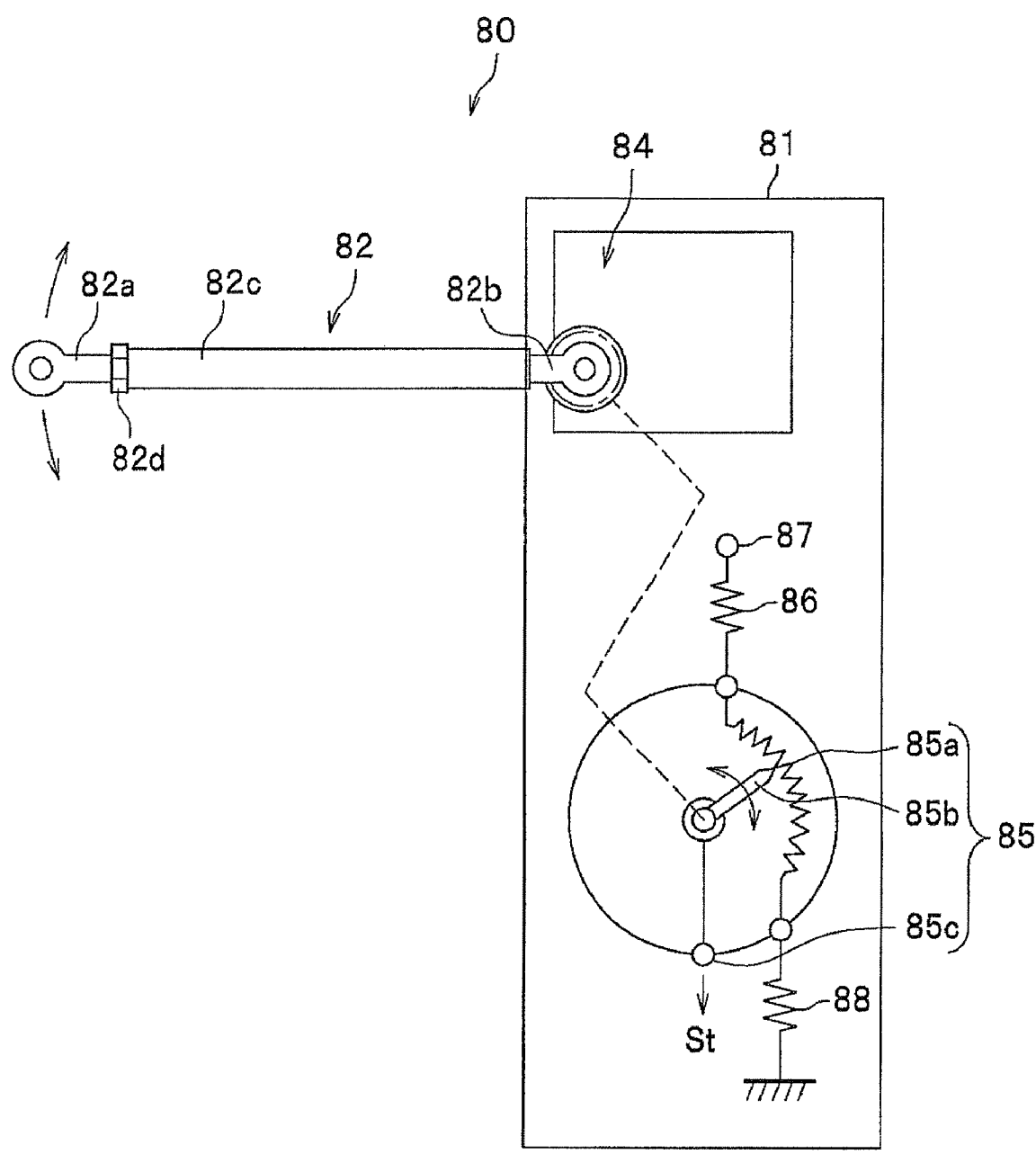
FIG. 4 is an exemplary diagram showing a displacement amount detector.

Next, with reference to FIG. 4 and also FIG. 1 accordingly, an explanation will be given of the detailed structure of the displacement amount detector of the electric damper. FIG. 4 is an exemplary diagram showing the displacement amount detector.

When it is necessary to distinguish one of the displacement amount detectors 80 from the other, as explained above, letters FL, FR, RL, RR are put after a reference number, but when there is no necessity to distinguishably refer individual displacement amount detector, will be simply described as a displacement amount detector 80.

As shown in FIG. 1, the displacement amount detector 80 has a swing rod 82 hanged between the lower arm 12 and the vehicle body 6, and a sensor housing 81 attached to the vehicle body 6, and detects the displacement amount of a swing angle that the lower arm 12 swings in the vertical direction, thereby detecting displacement of vertical movement of the wheel 1, i.e., indirectly detecting stroke.

Hereinafter, an explanation will be given of a left displacement amount detector 80RL in detail. As shown in FIG. 4, the displacement amount detector 80 has the swing rod 82 having one end 82a rotatably connected to the lower arm 12 (see FIG. 1), while the other end 82b thereof is rotatably connected to the shaft of a transfer mechanism 84 protruding from the sensor housing 81, and the transfer mechanism 84 is connected to, for example, a potentiometer 85 inside the sensor housing 81.

The swing rod 82 comprises the one end 82a, the other end 82b, a tubular adjustment tube 82c, and a rock nut 82d. In FIG. 4, the inner circumference of the adjustment tube 82c at the one end 82a side is female threaded, and the male thread of the one end 82a is threaded in the adjustment tube 82c, thereby assembling them into one swing rod 82. When the swing rod 82 is connected to the lower arm 12 and the transfer mechanism 84, the one end 82a is rotated to adjust the length, and after the adjustment of the length is completed, the rock nut 82d is tightened to the adjustment tube 82c, thereby fixing the entire length of the swing rod 82.

The potentiometer 85 is for detecting the swing angle of the swing rod 82. The potentiometer 85 comprises a resistor 85a and a sliding element 85b. The resistor 85a has one end connected to a constant-voltage source 87 via a resistor 86. The resistor 85a has the other end grounded via a resistor 88. The sliding element 85b can slide over the resistor 85a in accordance with a swing motion of the swing rod 82. A voltage signal acquired by the sliding element 85b (a detection signal of the displacement amount detector 80) is output from an output terminal 85c. In this fashion, the displacement amount detector 80 detects the displacement amount $S_t$ of the wheel 1 shown in FIG. 1 via the lower arm 12.

The following is a brief summary of the foregoing explanation (see FIGS. 1 to 4).

The suspension mechanism 14 coaxially houses the rod 32 of the electric damper conversion mechanism 30 and the rod 42, housing the rod 32 and provided at the lower side of the damper housing 31, inwardly of the inner-diameter direction of the coil spring 36, and has the rack and pinion mechanism 33 and the electric motor 35 above the spring seat 71 fixed to the rod 42 for fixing the upper end 36a of the coil spring 36.

That is, among the structural components of the electric damper conversion mechanism 30, only the rod 32 is included in under part of the coil spring 36, so that the suspension device 14 has a very lightweight structure.

In addition, unlike conventional hydraulic damper devices, it is not necessary to provide a hydraulic piston, having a large diameter, inwardly of the coil diameter of the coil spring 36, it is possible to design the coil spring 36 so as to have a small coil diameter, so that the degree of freedom of the designing of the coil spring 36 is enhanced, miniaturization and weight saving are accomplished, and it is possible to design a large room space of the vehicle 2.

Furthermore, as the coil spring 36 can support a load above the coil spring 36 (including the vehicle body 6) the electric motor 35 can merely control the damper function, i.e., damping force. Accordingly, it is possible to select a small electric motor 35 having a small output. Accordingly, it is possible to miniaturize the electric damper conversion mechanism 30 entirely and to reduce the weight of the entire electric damper conversion mechanism 30.

By miniaturizing the electric motor 35 and reducing the weight thereof, it is possible to reduce the mechanical internal loss of the motor itself and to reduce the output loss inherent to the inertia of a rotor. For example, the smaller the diameter of the rotor is, the smaller the moment of inertia of the rotor becomes (moment of inertia is proportional to the square of the rotor diameter). Therefore, in controlling damping force by the electric motor 35, any influences inherent to the mechanical internal loss of the electric motor 35 itself and the rotor inertia can be suppressed as much as possible, and the vertical movement of the wheel 1 relative to the vehicle body 6 can be damped with a good response, so that the vehicle 2 can be stabilized and the vertical movement can be smoothly settled.

Further, when the wheel 1 moves in the vertical direction, the electric motor 35 does not move in the vertical direction together with the wheel 1, resulting in enhancement of the durability of the electric motor 35.

[Control Circuit and Motor Driving Circuit of Electric Damper]

Next, with reference to FIG. 5 and also FIGS. 1, 2, 6 and 7 accordingly, an explanation will be given of the control circuit and electric motor driving circuit of the electric damper 303.

Figure 5:
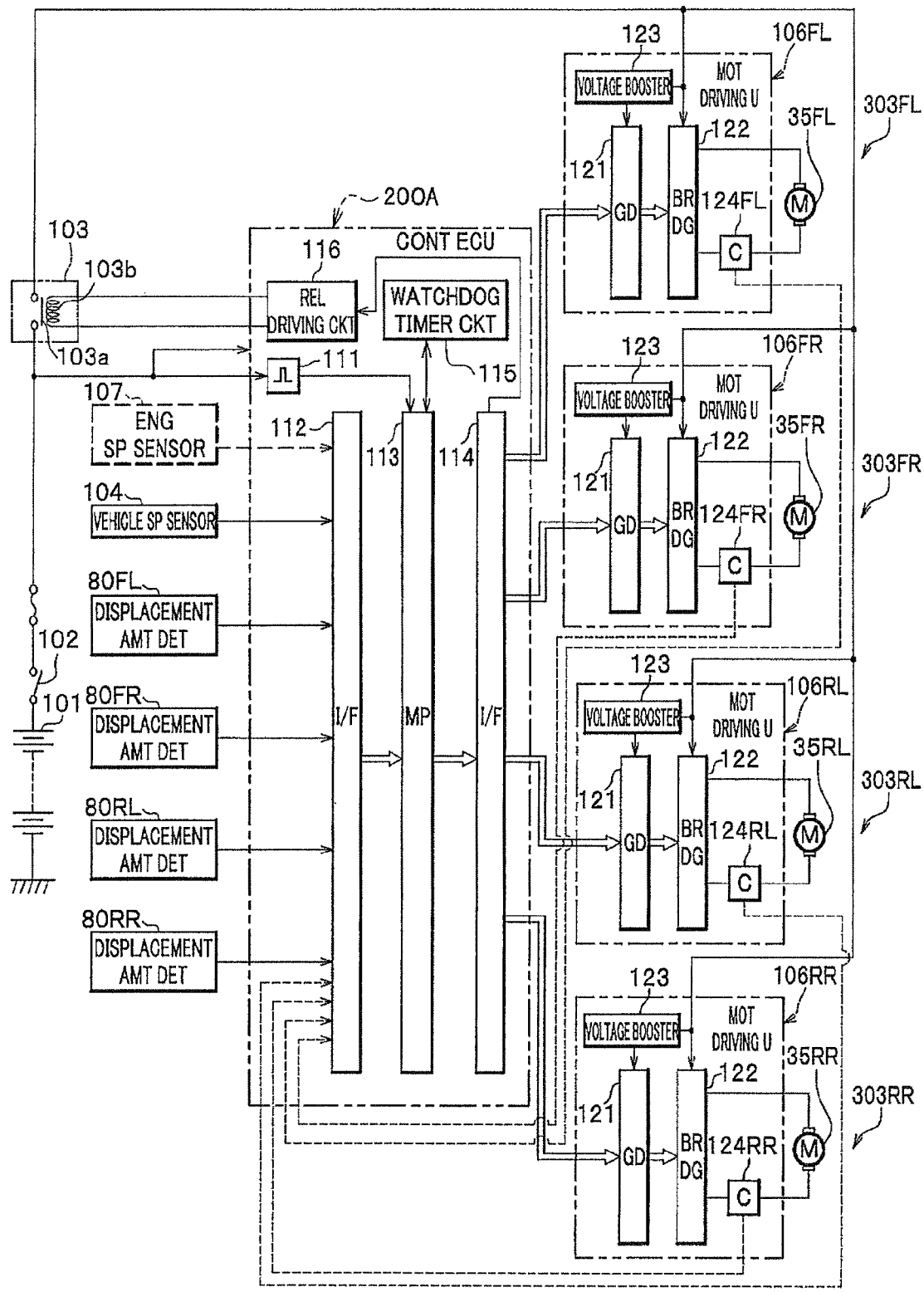
FIG. 5 is a block diagram showing the structures of the control circuit and electric motor driving circuit of the electric damper.
Figure 6:
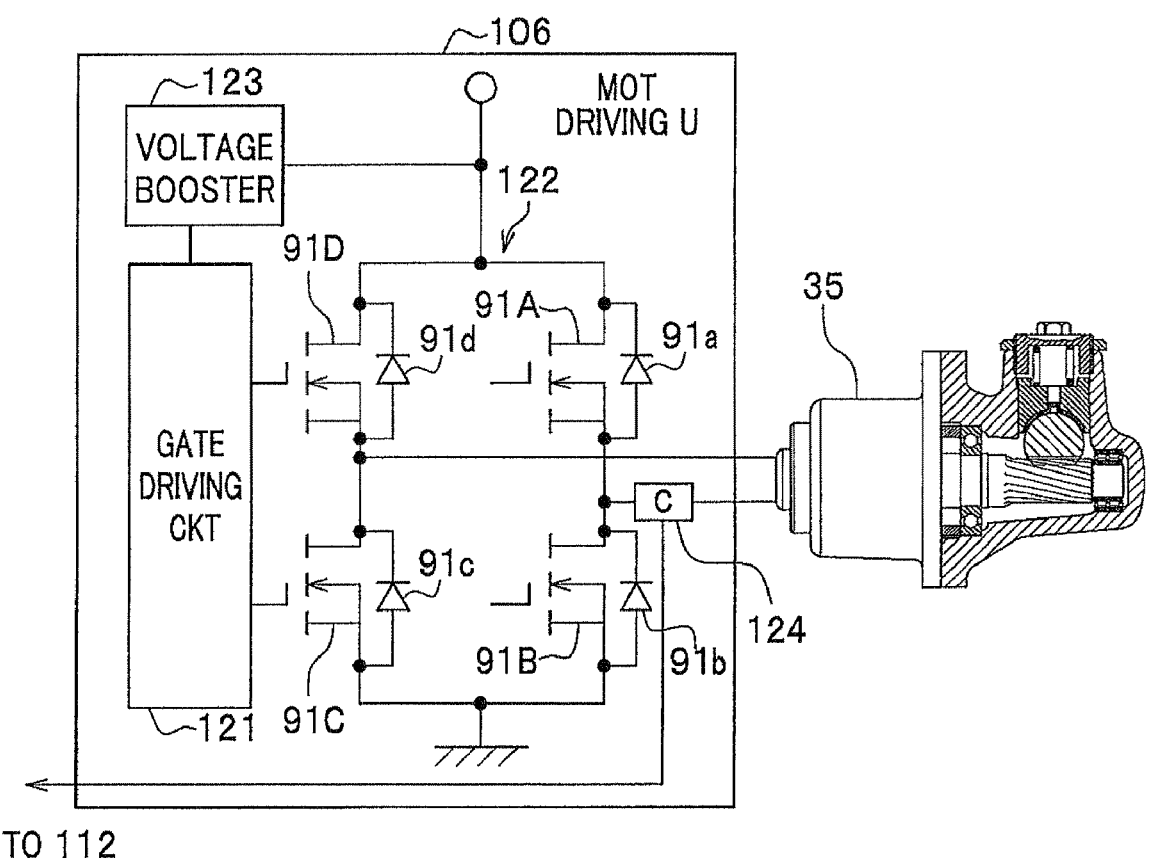
FIG. 6 is a diagram showing an H-bridge circuit as an example of a bride circuit forming the electric motor driving circuit of the electric damper.

FIG. 5 is a block diagram showing the structures of the control circuit and electric motor driving circuit of the electric damper 303, and FIG. 6 is a diagram showing an H-bridge circuit as an example of a bride circuit forming the electric motor driving circuit of the electric damper.

As shown in FIG. 5, the control circuit and electric motor driving circuit of the electric damper 303 include a battery 101, a main switch 102, a main relay 103, the vehicle speed sensor 104, the displacement amount detectors 80 (80FL, 80FR, 80RL, and 80 RR in the figure) for individual wheels, the control ECU 200A, and the motor driving unit 106 (106FL, 106FR, 106RL, 106RR in the figure) for individual electric dampers 303 (303FL, 303FR, 303RL, and 303RR in the figure).

The main switch 102 comprises, for example, an ignition switch. The main relay 103 comprises, for example, an excitation coil 103b responsive through a relay driving circuit 116 to a control ECU 200A which allows a current to flow through normally-opened contacts 103a, one of which is connected to the battery 101 and the other of which is connected to the motor driving unit 106.

[Control ECU]

The control ECU 200A has a damping control function of driving the electric motors 35 (35FL, 35FR, 35RL, and 35RR in FIG. 5) of individual electric damper conversion mechanisms 30 based on a signal from each displacement amount detector 80 to control the vertical movement of each wheel 1 (see FIG. 1). The control ECU 200A includes, for example, a one-pulse generation circuit 111, the microcomputer 113, an input interface circuit (I/F) 112 for the input signal to the microcomputer 113, an output interface circuit (I/F) 114 for the output signal from the microcomputer (MP) 113, a watchdog timer circuit 115, and the relay driving circuit 116.

The one-pulse generation circuit 111 generates a one-pulse signal to the microcomputer 113 when the main switch 102 is turned ON, and comprises, for example, a differentiating circuit.

The input interface circuit 112 comprises, for example, a half-bridge circuit and an amplification circuit which convert a change in a resistance corresponding to a change in the swing angle of the displacement amount detector 80 into a voltage, a schmitt trigger circuit which performs waveform shaping on a pulse signal from a low-pass filter or the vehicle speed sensor 104, an amplification circuit which amplifies a signal from motor current sensors 124 (124FL, 124FR, 124RL, 124RR in FIG. 5) to be discussed later, and a low-pass filter which eliminates noises from each signal. Analog signals voltage-converted or amplified are converted into digital signals by non-illustrated A/D converters, and are input into the input port of the microcomputer 113. Moreover, a pulse signal wave-shaped like a vehicle speed signal is directly input into the input port.

Note that an analog signal voltage-converted or amplified by the input interface circuit 112 may be input into an A/D port of the microcomputer 113.

Return to FIG. 5, the watchdog time circuit 115 receives a constant-period signal from the microcomputer 113, monitors the signal, and when the microcomputer 113 breaks down and a constant-period signal is lost or the period of the signal goes wrong, detects such an incident, generates an abnormality signal to the microcomputer 113 to terminate the microcomputer 113, and terminates the relay driving circuit 116 to turn OFF the main relay 103.

When the microcomputer 113 is in a normal operation, the watchdog timer circuit 115 allows the microcomputer 113 to output a control signal to the relay driving circuit 116 to drive the relay driving circuit 116, and to turn ON the main relay 103.

Moreover, when the microcomputer 113 detects its abnormal operation condition through its local failure-diagnosis control flow, the microcomputer 113 turns OFF the main relay 103 via the relay driving circuit 116.

The microcomputer 113 applies a control signal to the relay driving circuit 116 through the output interface circuit 114, and applies a control signal for controlling each electric motor 35 of the damper to the motor driving circuit 106 therethrough.

Each motor driving unit 106 of the damper 303 has a gate driving circuit (GD) 121, a bridge circuit (BRDB) 122, a voltage booster 123, and the motor current sensor (C) 124.

As shown in FIG. 6, when the electric motor 35 is a DC motor with a brush, the bridge circuit 121 comprises, for example, a so-called H-bridge circuit in which switching elements that are four N-channel enhancement type FETs (Field Effect Transistors) 91A, 91B, 91C, and 91D are connected like a shape of a letter of "H".

In the figure, parasitic diodes of the FETs 91A, 91B, 91C, and 91D are denoted with reference numbers $91a$, $91b$, $91c$, and $91d$.

Next, an explanation will be given of the method of controlling damping force by regenerative electric generation by the H-bride circuit of the electric damper.

Figure 7A:
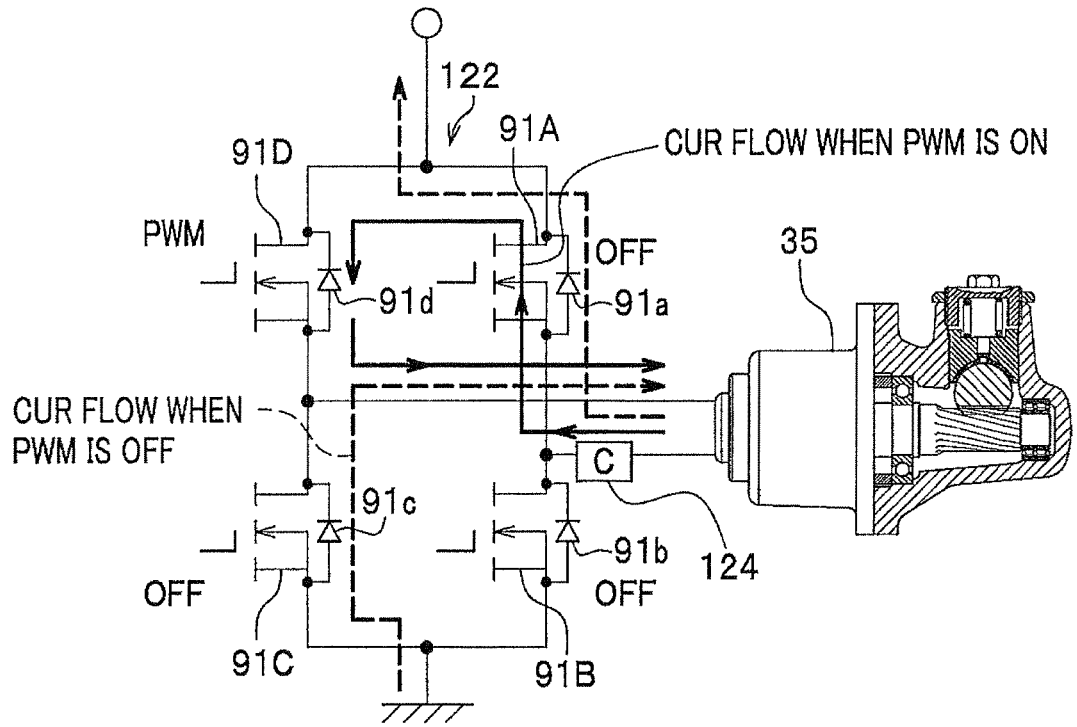
Figure 7B:
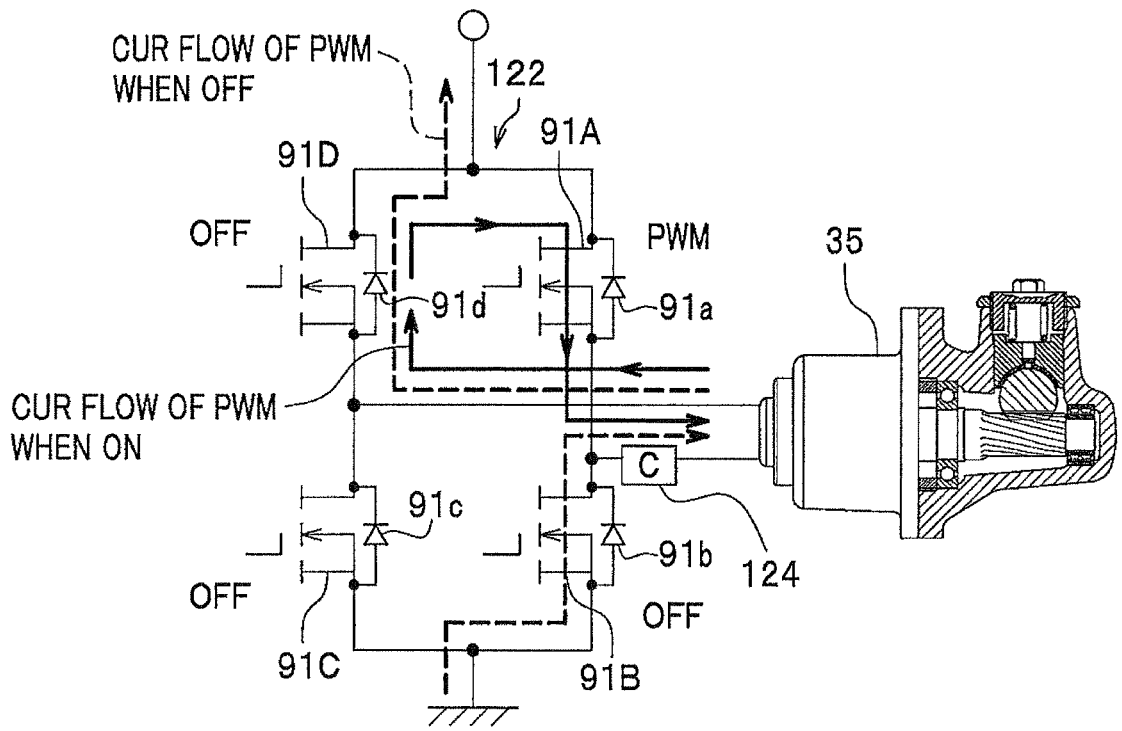

FIGS. 7A and 7B are diagrams for explaining control conditions of the four FETs in the H-bridge circuit of the damper, wherein FIG. 7A is a diagram for explaining the control condition of each FET in a case of regenerative electric generation on an elongation side, and FIG. 7B is a diagram for explaining the control condition of each FET in a case of regenerative electric generation on a shrinkage side.

In the embodiment, it is defined that a motor current regenerated when the electric motor 35 is moved to the elongation state (side), i.e., when the rod 32 (see FIG. 2) is moved downwardly is "positive", and a motor current regenerated when the electric motor 35, is moved to the shrinkage state (side), i.e., when the rod 32 moves upwardly, is "negative".

The voltage booster 123 is a circuit including a resistor and a capacitor, substantially doubles the voltage of a power supplied from the battery 101 (see FIG. 5) and supplies the doubled voltage to the gate driving circuit 121. The gate driving circuit 121 controls the gate voltages of the FET 91A and the FET 91D in the FETs 91A to 91D of the bridge circuit 122 based on a control signal received from the microcomputer 113 (see FIG. 5) through the output interface circuit 114 using the high voltage supplied from the voltage booster 123, and efficiently performs ON/OFF control on individual FETs 91A to 91D of the H-bridge circuit while minimizing the loss.

Note that the ON/OFF control includes PWM (Pulse Width Modulation) control.

FIGS. 7A and 7B are diagrams for explaining examples of current flows in the bridge circuit under PWM control, and particularly show current flows when the electric motor 35 is caused to do regenerative electric generation. FIG. 7A shows a current flow in an ON state and an OFF state under the PWM control when the rod 32 moves to the elongation side (downwardly) and the electric motor 35 is caused to do regenerative electric generation to apply damping force to an elongation movement. FIG. 7B shows a current flow in an ON state and an OFF state under the PWM control when the rod 32 moves to the shrinkage side (upwardly) and the electric motor 35 is caused to do regenerative electric generation to apply damping force to a shrinkage movement.

In the case of elongation regenerative electric generation, as shown in FIG. 7A, FETs 91A, 91B, 91C are maintained in an OFF state, but the FET 91D is subjected to ON/OFF control under the PWM control through the voltage booster 123. In the ON state under the PWM control, as shown in the solid line, a current generated by the electric motor 35 is caused to flow through from the source side to the drain side by the parasitic diode $91a$ of the FET 91A, returns to the source side from the drain side of the FET 91D, returns to the electric motor 35, and then the electric motor 35 generates damping force. In the OFF state under the PWM control, if it is assumed that the inductance of the electric motor 35 is L and a current flowing through the electric motor 35 is i, then based on an equation $V=L\,di/dt$, a voltage V higher than the battery voltage is generated, a current i input from the ground is caused to flow through from the drain side to the source side by the parasitic diode $91c$ of the FET 91C, is caused to flow through the source side to the drain side by the parasitic diode $91a$ pinion of the FET 91A via the electric motor 35, and then flow into the battery 101 (see FIG. 5), thereby charging the battery 101.

If dt of di/dt is small, i.e., if the PWM carrier frequency is set high, the voltage V can become higher than the battery voltage even if i is small, and regeneration shown by the dashed line can be performed.

A method of controlling a regenerative current generated by the electric motor 35 and damping force will be explained in detail more. It is assumed that, for example, the FET 91D is subjected to PWM driving but the other FETs 91A, 91B, and 91C are all in an OFF state as shown in FIG. 7A when the electric motor 35 is in rotation. At this time, since PWM is kept to have a 100% duty, i.e., since the FET 91A is maintained in an ON state because of its parasitic diode $91a$, it becomes substantially true that the terminals of the electric motor 35 are short-circuited. A current flowing at this time is indicated by the solid line in FIG. 7A. A current flowing into the electric motor 35 at this time becomes maximum, for example, 10 A, and damping force corresponding to 10 A is generated. Next, if it is assumed that the duty of PWM is 50%, then when the 50% duty of PWM is ON (in practice, because of the inductance L of the electric motor 35, it does not rise soon, but in order to simplify the explanation) approximately 10 A of a current flows. When the 50% duty of PWM is OFF, a current indicated by the dashed line in FIG. 7A flows. At this time, because the voltage of the regenerative electric generation of the electric motor 35 is originally lower than the battery voltage, a voltage between the motor terminals becomes higher than the battery voltage right after a condition when a state changes from ON to OFF because of the inductance of the electric motor 35, and a 10-A current flows into the battery, but because the voltage between the motor terminals becomes low over time, the current becomes 0 A. If it is assumed that the average value of a change in the current while the current by the regenerative electric generation becomes 0 A from 10 A is 3 A, this average value of the current is regenerated and changed in the battery. In focusing on the electric motor 35, a current value in the initial 50%-ON state is 10 A, and a current value in the following 50%-OFF state is 3 A at average, so that an overall average current value becomes 6.5 A. The motor current sensor 124 detects this average current, and if the duty is changed in such a manner as to achieve a target current while detecting a current flowing through the electric motor 35 by the motor current sensor 124, i.e., if the ON time of the duty of PWM is controlled, regenerative electric generation can be realized while controlling the damping force of the electric motor 35.

The explanation has been given of the method of controlling a regenerative current and damping force in the case of elongation regenerative electric generation through FIG. 7A, but the same is true for the method of controlling a regenerative current and damping force in shrinkage regenerative electric generation shown in FIG. 7B.

In the case of shrinkage regenerative electric generation, as shown in FIG. 7B, FETs 91B, 91C, 91D are maintained in an OFF state, and the FET 91A is subjected to ON/OFF control by the PWM control through the voltage booster 123. In the ON state under the PWM control, as shown in the continuous line, a current generated by the electric motor 35 (see FIG. 5) is caused to flow through from the source side to the drain side by the parasitic diode 91d of the FET 91D, returns to the source side from the drain side of the FET 91A, returns to the electric motor 35, and then the electric motor 35 generates damping force. In the OFF state under the PWM control, based on the foregoing equation V=L di/dt, as a voltage V sufficiently higher than the battery voltage is generated, a current input from the ground is caused to flow through from the source side to the drain side by the parasitic diode 91b of the FET 91B, is caused to flow through from the source side to the drain side by the parasitic diode 91d of the FET 91D via the electric motor 35, and then flows into the battery 101 (see FIG. 5), thereby charging the battery 101.

If dt of di/dt is small, i.e., if the PWM carrier frequency is set high, a voltage V can become higher than the battery voltage even if i is small, and regeneration indicated by the dashed line can be realized.

The motor current sensor 124 comprises, for example, a hall element and a resistor, detects a driving current actually supplied to the electric motor 35 from the bride circuit 122, and inputs a current value If of the detected current into the control ECU 200A.

[Control Functions of Microcomputer for Electric Power Steering and Electric Damper]

Next, with reference to FIGS. 8 to 15, also FIG. 5 accordingly, an explanation will be given of the control functions of the microcomputer.

Figure 8:
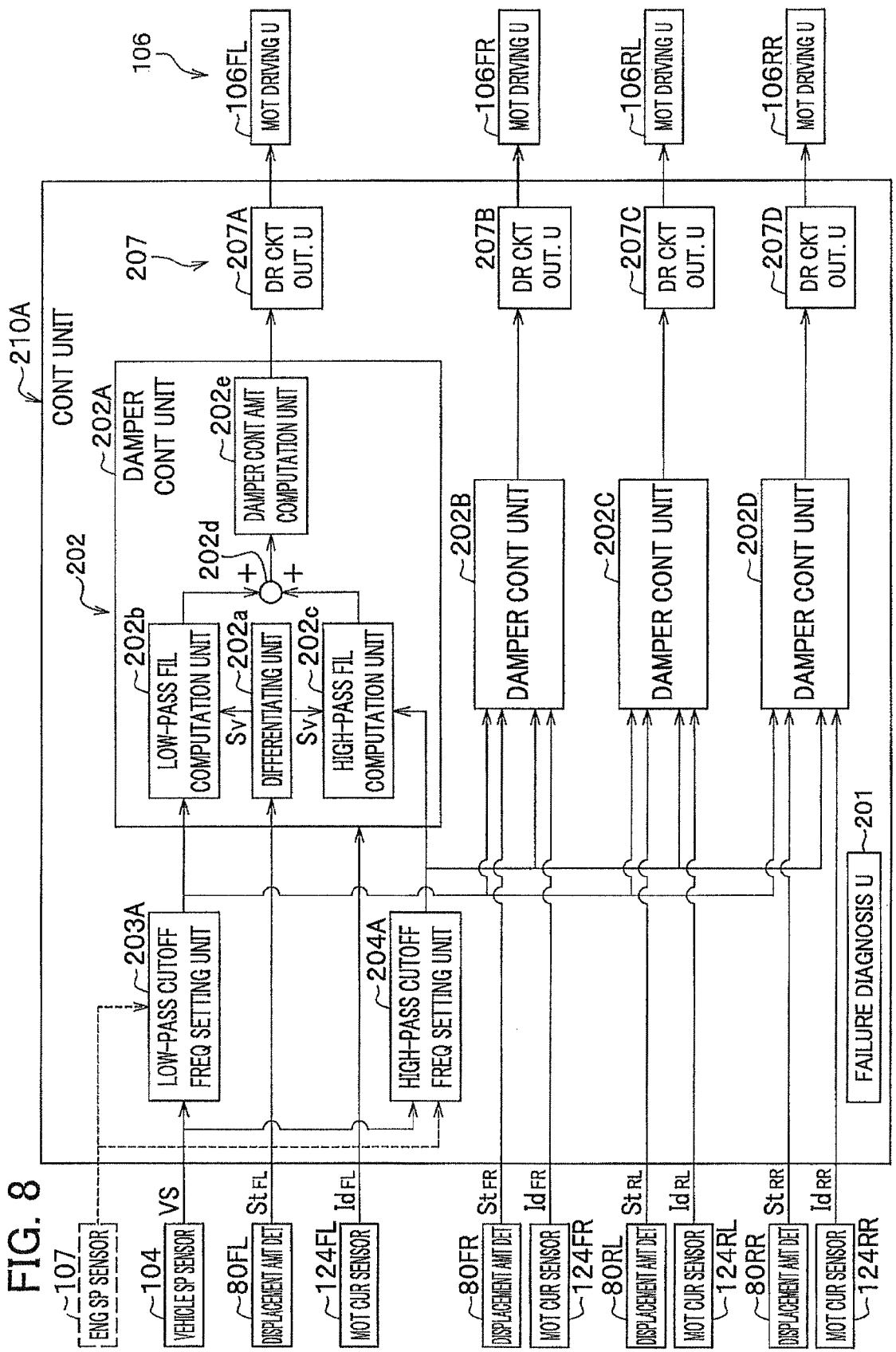
FIG. 8 is a control-function block diagram showing the electric damper.

FIG. 8 is a block diagram of the electric damper.

The microcomputer 113 (see FIG. 5) comprises, a non-illustrated memory, such as a ROM (Read Only Memory), a RAM (Random Access Memory), or a flash memory, a CPU (Central Processing Unit), an A/D converter and the like. To control the electric damper conversion mechanisms 30FL, 30FR, 30RL, and 30RR included in the electric dampers 303FL, 303FR, 303RL, and 303RR, respectively, the CPU executes functions shown in a control unit (damping unit) 210A in FIG. 8, using a program stored in the ROM and various data stored in the flash memory.

The control unit 210A has a failure diagnosis unit 201 that detects any failures of the vehicle speed sensor 104 and the displacement amount detector 80 (in FIG. 8, denoted as 80FL, 80FR, 80RL, and 80RR) and the like using a software, and when detecting any failures, generates and send an abnormality signal to the relay driving circuit 116 (see FIG. 5) to terminate the control of all electric dampers 303.

Regarding the failure diagnosis of the failure diagnosis unit 201 for the vehicle speed sensor 104 or the displacement amount detector 80, for example, a detection voltage signal is set to be within a predetermined range in a normal operation, and when a signal from the vehicle speed sensor 104 or the displacement amount detector 80 is out of such a predetermined range, it is determined that there is a failure.

The control unit 210A further has a damper control unit 202, a low-pass cutoff frequency setting unit 203A, a high-pass cutoff frequency setting unit 204A, and a driving circuit output unit 207.

The damper control unit 202 includes four damper control units 202A, 202B, 202C, and 202D provided for controlling respective electric motors 35FL, 35FR, 35RL, and 35RR. The driving circuit output unit 207 includes four driving circuit output units 207A, 207B, 207C, 207D outputting gate control signals to motor driving units (MOT DR U) 106FL, 106FR, 106RL, 106RR of the electric motors 35FL, 35FR, 35RL, and 35RR, respectively.

The low-pass cutoff frequency setting unit 203A sets a low-pass cutoff frequency with reference to a vehicle speed VS based on, for example, a lookup table or a function (see FIG. 11A) which is stored in the flash memory of the microcomputer 113 (see FIG. 5) and which is for setting a cutoff frequency of a low-pass filter with a vehicle speed being a parameter. The high-pass cutoff frequency setting unit 204A sets a high-pass cutoff frequency with reference to a vehicle speed VS based on, for example, a lookup table or a function (see FIG. 11B) which is stored in the flash memory of the microcomputer 113 (see FIG. 5) and which is for setting a cutoff frequency of a high-pass filter with a vehicle speed being a parameter.

The damper control units 202A, 202B, 202C, and 202D individually have a differentiating unit 202a, a low-pass filter computation unit 202b, a high-pass filter computation unit 202c, an adder 202d, and a damper control amount computation unit 202e. The detailed functions of those units will be discussed later with reference to the flowcharts of FIGS. 10 and 12.

[Overall Control Flow]

Next, with reference to FIG. 9, also FIGS. 1, 5, 6 and 8 accordingly, an explanation will be given of the overall control flow in the electric damper.

FIG. 9 is a main flowchart showing the entire control in the electric damper.

As the main switch 102 (see FIG. 5), e.g., a key switch of the vehicle 2, is turned ON, a source voltage from the battery 101 is supplied to the control ECU 200A. Then, the one-pulse generation circuit 111 (see FIG. 5) in the control ECU 200A detects this power activation, resets the microcomputer 113 (see FIG. 5), and a program set in the microcomputer 113 beforehand is activated in synchronization with a clock signal supplied from a non-illustrated crystal oscillator.

Below is a process in the control unit 210A (see FIG. 8).

First, in step S01 (sensor signal reading step), signals or the like from the displacement amount detector 80 (in FIG. 8, denoted with 80FL, 80FR, 80RL, and 80RR), the vehicle speed sensor 104, and the motor current sensor 124 (in FIG. 8, denoted with 124FL, 124FR, 124RL, and 124RR) are read.

In step S02 (failure diagnosis step), the failure diagnosis unit 201 (see FIG. 8) performs failure diagnosis on the sensors which has output the signals read in the step S01. Regarding the failure diagnosis on the displacement amount detector 80, for example, a detection voltage is set to be within a predetermined range in a normal operation, and it is determined that there is a failure if the voltage is out of the predetermined range. Regarding the vehicle speed sensor 104 (see FIG. 8), a signal from the engine speed sensor 107 (see FIG. 8) is input into the failure diagnosis unit 201 to estimate the vehicle speed, is compared with a predetermined voltage range, and if the signal value is outside the predetermined range and is abnormal, it is determined that there is a failure. As a result, if it is determined that there is a failure, the main relay 103 (see FIG. 8) is turned OFF through the relay driving circuit 116 (see FIG. 8) to shut off power supply. When all sensors are in a normal operation condition, the flow goes to next step S03.

In the step S03 (calculation of motor control amount of motor-driven damper and FET control step), the low-pass cutoff frequency setting unit 203A (see FIG. 8) and a high-pass cutoff frequency setting unit 204A (see FIG. 8) respectively set cutoff frequencies, and in response to this setting, the damper control unit 202 (see FIG. 8) calculates damping force necessary to control the damper as a control amount of the electric motor 35 (see FIG. 5, in the figure, denoted as 35FL, 35FR, 35RL, and 35RR) based on the signal from the displacement amount detector 80, and based on the calculation result, drives individual FETs 91A to 91D (see FIG. 6) in the bridge circuit 122 (see FIG. 6). Thereafter, the flow returns to the step S01.

Next, with reference to FIG. 5, and also FIGS. 5, 8 and 11 accordingly, an explanation will be given of the flow of the calculation of the motor control amount of the motor-driven damper and of the FET controlling. FIG. 10 is a main flowchart for the calculation of a motor control amount and the controlling of the FET driving in a motor-driven damper.

According to the main flowchart, individual electric motors 35FL, 35FR, 35RL and 35RR (see FIG. 5) are to be concurrently controlled, and the damper controlling requires a rapid responsiveness, so that it is desirable that the microcomputer 113 (see FIG. 5) should comprise a multi-core type CPU.

Figure 11A:
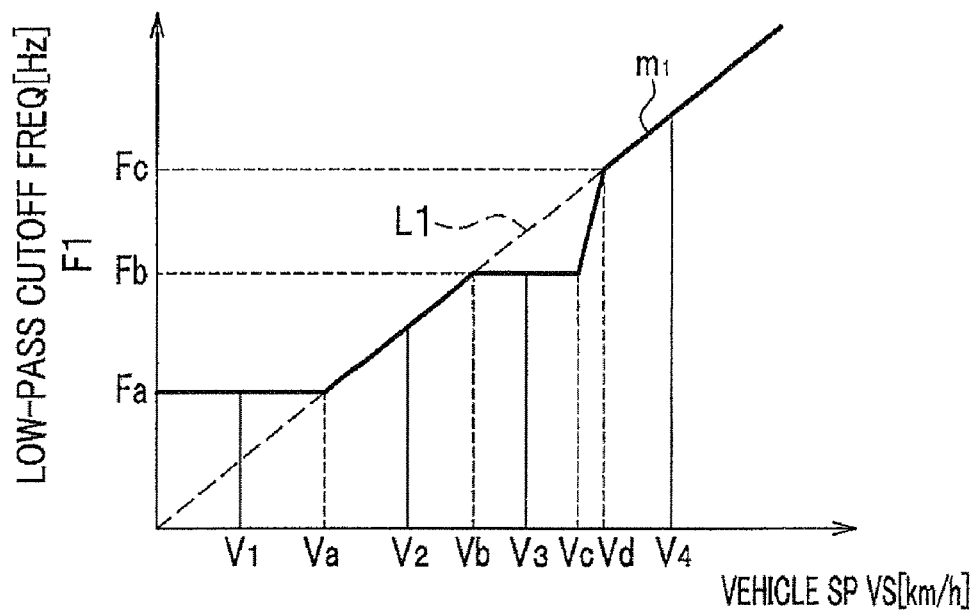
FIG. 11A is a diagram showing a function for setting a cutoff frequency of a digital low-pass filter.

In step S11, the low-pass cutoff frequency setting unit 203A (see FIG. 8) refers to a vehicle speed VS, and sets a cutoff frequency, to be used by the low-pass filter computation unit 202$b$ (see FIG. 8), on the basis of a function shown in FIG. 11A.

FIG. 11A shows a function for setting the cutoff frequency of a digital low-pass filter (hereinafter, low-pass cutoff frequency), wherein a horizontal axis represents a vehicle speed VS (km/h) and the vertical axis represents a low-pass cutoff frequency (Hz).

A curved line $m_1$ of the function is set on the basis of, for example, a straight line L1 indicated by a dashed line and having a predetermined inclination passing through the origin. When the vehicle speed VS is less than a predetermined value $V_a$, the corresponding portion of the curved line represents a constant low-pass cutoff frequency $F_a$. When the vehicle speed VS is greater than or equal to $V_a$ and is less than $V_b$, the corresponding portion of the curved line is the straight line L1. When the vehicle speed VS is greater than or equal to $V_b$ and is less than $V_c$, the corresponding portion of the curved line shows a constant low-pass cutoff frequency $F_b$. When the vehicle speed VS is greater than or equal to $V_c$ and is less than $V_d$, the corresponding portion of the curved line is a straight line interconnecting a point ($V_c$, $F_b$) and a point ($V_d$, $F_c$) and having a larger inclination than that of the straight line L1. Further, when the vehicle speed VS is greater than or equal to $V_d$, the corresponding portion of the curved line is the straight line L1.

Figure 11B:
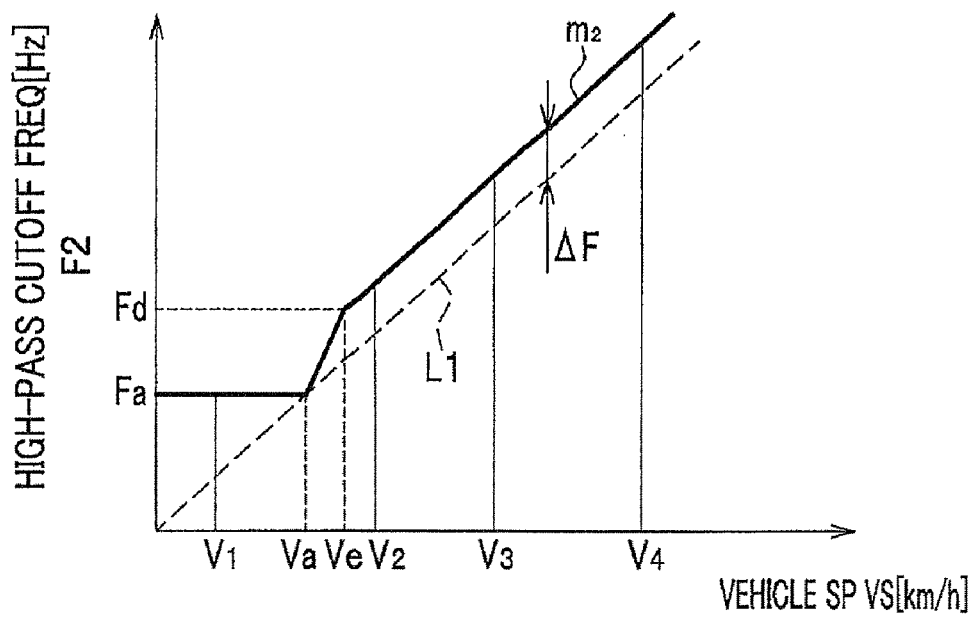
FIG. 11B is a diagram showing a function for setting a cutoff frequency of a digital high-pass filter.

In step S12, the high-pass cutoff frequency setting unit 204A (see FIG. 8) refers to the vehicle speed VS, and sets a cutoff frequency, to be used by the high-pass filter computation unit 202$c$ (see FIG. 8), based on the function shown in FIG. 11B.

FIG. 11B shows the function for setting a cutoff frequency of a digital high-pass filter (hereinafter, high-pass cutoff frequency), wherein the horizontal axis represents a vehicle speed VS (km/h) and the vertical axis represents a high-pass cutoff frequency (Hz).

A curved line $m_2$ of the function is set on the basis of, for example, a straight line L1 having a predetermined inclination and passing through the origin. When the vehicle speed VS is less than $V_a$, the corresponding portion of the curved line is a constant high-pass cutoff frequency $F_a$. When the vehicle speed VS is greater than or equal to $V_a$ and is less than $V_e$, the corresponding portion of the curved line is a straight line having a larger inclination than the straight line L1 and interconnecting a point ($V_a$, $F_a$) and a point ($V_e$, $F_d$). When the vehicle speed VS is greater than or equal to $V_e$, the corresponding portion of the curved line is a straight line which passes through a point ($V_e$, $F_d$), has the same inclination as that of the straight line L1, and is larger than by $\Delta F$.

In FIGS. 11A and 11B, the magnitude relation of the values of the vehicle speed VS is $V_a < V_e < V_b < V_c < V_d$, and between the curved lines $m_1$ and $m_2$ of the functions, the low-pass cutoff frequency F1 is set to be smaller than the high-pass cutoff frequency F2 by $\Delta F$ in two intervals where the vehicle speed VS is from $V_e$ to $V_b$, and where the vehicle speed VS is greater than or equal to $V_d$. When there is unbalance wheel vibration, in particular, when there is initial vibration thereof, the vibration of the vertical motion of the wheel inherent to such an initial vibration has a frequency increasing proportionally to the vehicle speed VS. Regarding setting of the low-pass cutoff frequency F1 and the high-pass cutoff frequency F2 depending on the vehicle speed VS, it is set that the frequency of unbalance wheel vibration corresponds to (F1+F2)/2. Such a basic straight line L1 and $\Delta F$ can be easily acquired from the data of a road test using an actual vehicle.

In a range where the vehicle speed is 0 to $V_a$, when the VS is small, unbalance wheel vibration is small and ignorable, so that the low-pass cutoff frequency F1 and the high-pass cutoff frequency F2 can be set to be same. The range where the vehicle speed VS is from $V_a$ to $V_e$ is a transition range, and the low-pass cutoff frequency F1 and the high-pass cutoff frequency F2 are set to become different correspondingly to the emergence of unbalance wheel vibration.

In a range where the vehicle speed VS is from $V_b$ to $V_d$, when unbalance wheel vibration causes, for example, the wheel 1 to vibrate resonantly with the vehicle 2 (see FIG. 1) in the vertical direction, the damping force by the electric damper 303 (see FIG. 5, in the figure, denoted as 303FL, 303FR, 303RL, and 303RR) in the frequency of such a vertical motion is further reduced and weakened so as not to transmit unbalance wheel vibration to the vehicle body 6 (see FIG. 1).

Note that such a setting may be carried out for the high-pass cutoff frequency F2 instead of the low-pass cutoff frequency, or may be carried out for both frequencies.

When unbalance wheel vibration does not cause the wheel 1 to vibrate in the vertical direction resonantly with the vehicle 2, setting of the low-pass cutoff frequency F1 in a range where the vehicle speed VS is from $V_b$ to $V_d$ is unnecessary.

Next, the damper control units 202A, 202B, 202C, and 202D (see FIG. 8) individually calculate the motor control amount of the electric damper conversion mechanism for each wheel, and drive FETs in step S13. The detailed flow of this control will be discussed later with reference to the flowchart in FIG. 12.

After the step S13, the flow returns to the step S03 in the flowchart of the overall control.

Next, with reference to FIG. 12 and also FIGS. 8, 11, 13, and 14 accordingly, an explanation will be given of the control flow of damping force generated by the electric motor 35 under the control of the damper control unit 202 and the drive circuit output unit 207.

Figure 12:
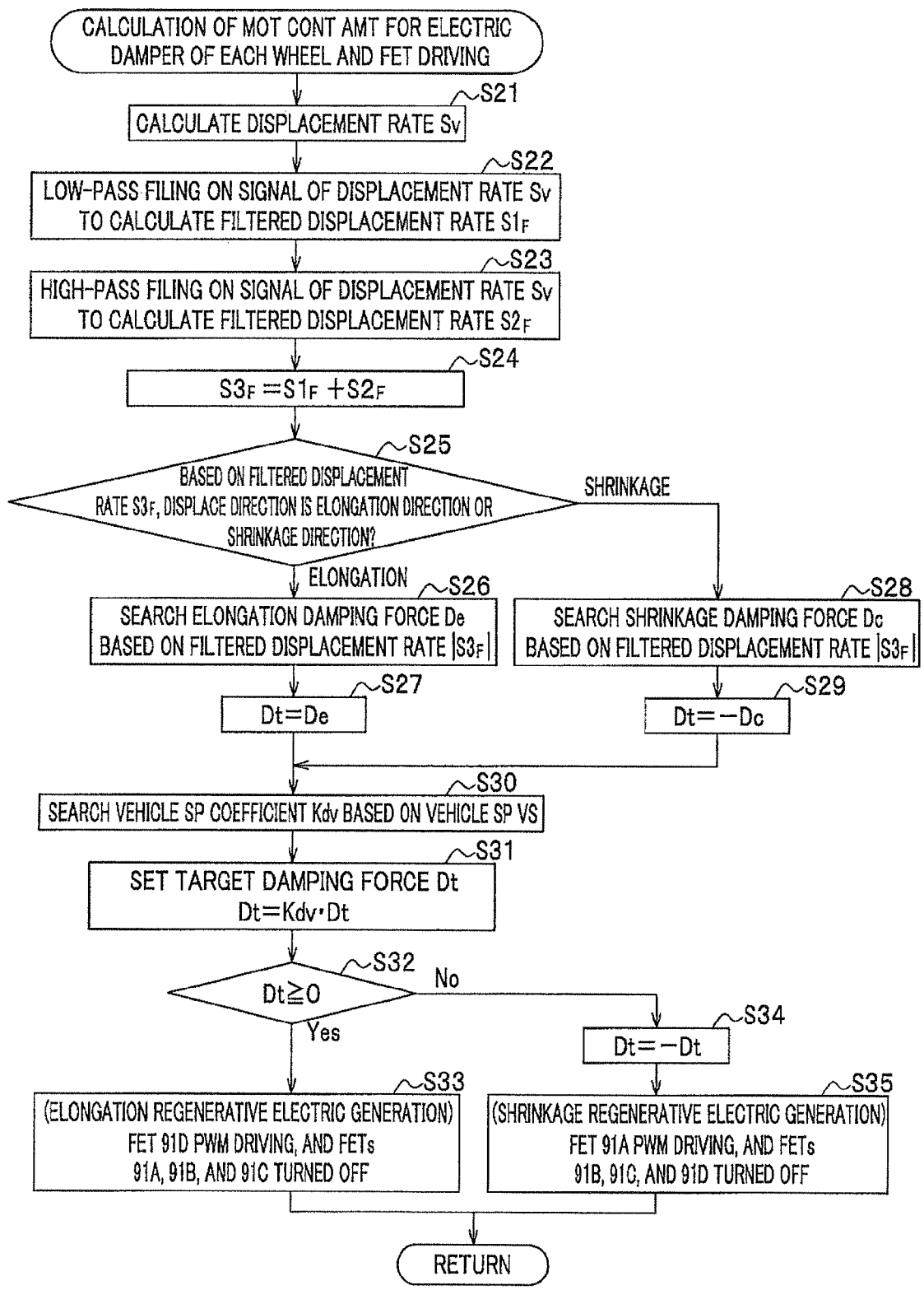
FIG. 12 is a flowchart showing the flow of the damping force controlling by the electric damper.

FIG. 12 is a flowchart showing the flow of the damping force controlling by the electric damper. An explanation will be given of the controlling of damping force in the damper control unit 202 (see FIG. 8) and the drive circuit output unit 207 (see FIG. 8) relative to one electric motor 35 representatively.

Figure 13A:
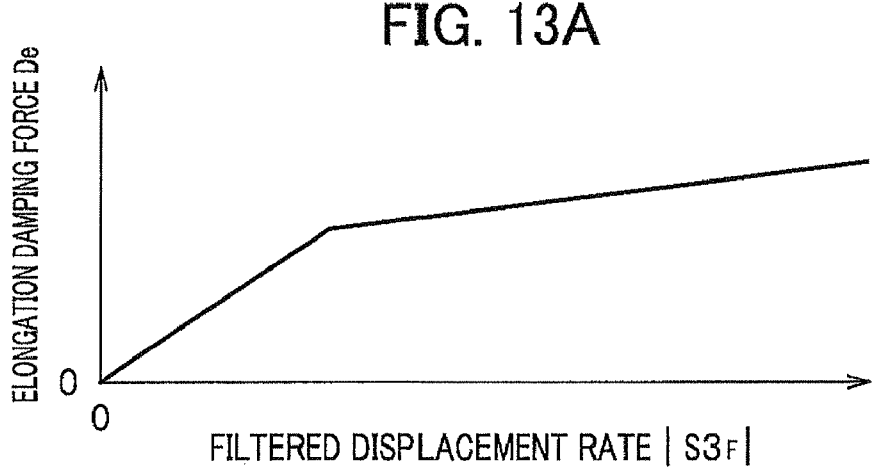
FIG. 13A is a diagram showing a relationship between the absolute value of a filtered displacement rate $S3_F$ and an elongation damping force De which is a control target value of an electric motor of the damper.
Figure 13B:
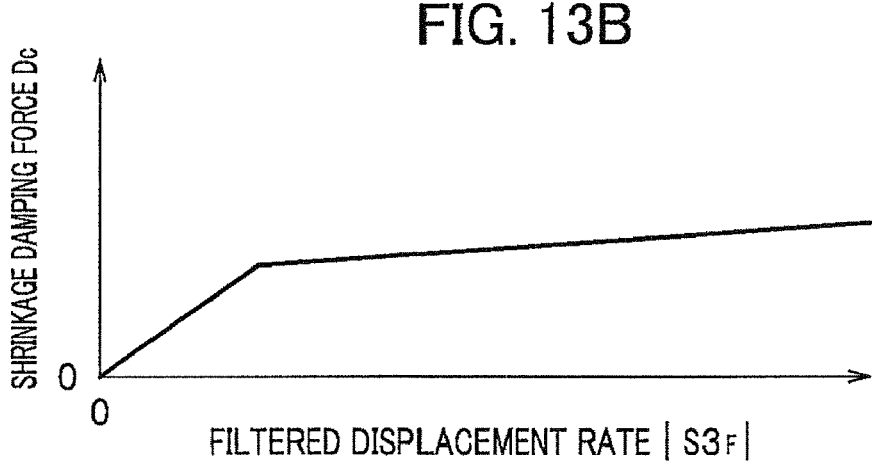
FIG. 13B is a diagram showing a relationship between the absolute value of the filtered displacement rate $S3_F$ and a shrinkage damping force Dc which is a control target value of the electric motor of the damper.
Figure 13C:
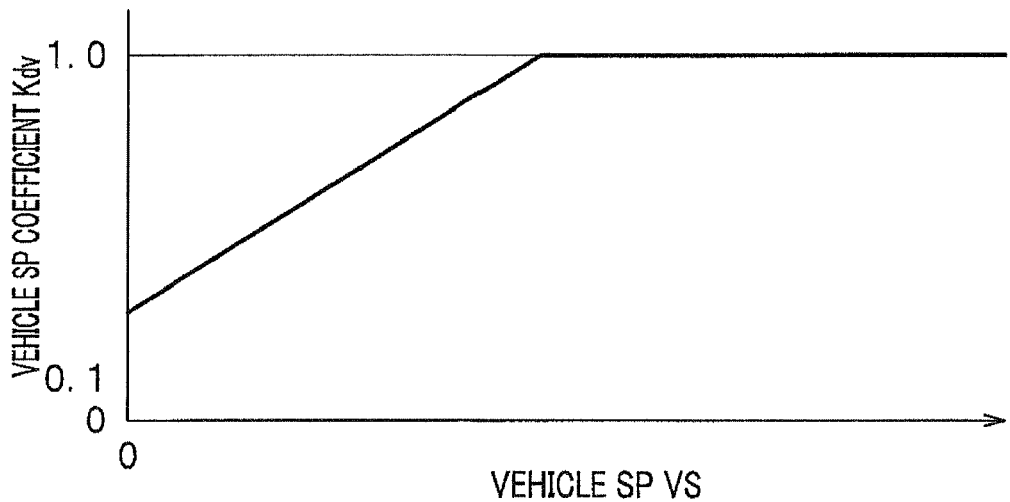
FIG. 13C is a diagram showing a function of a vehicle speed coefficient multiplied by the damping forces De, Dc.

FIG. 13A is a diagram showing a relationship between the absolute value of a filtered displacement rate $S3_F$ and an elongation damping force De which is a control target value of the electric motor of the damper. FIG. 13B is a diagram showing a relationship between the absolute value of the filtered displacement rate $S3_F$ and a shrinkage damping force Dc which is a control target value of the electric motor of the damper. FIG. 13C is a diagram showing a function of a vehicle speed coefficient Kdv multiplied by the elongation and shrinkage damping forces De, Dc.

As is clear from FIG. 13A, in accordance with the increment of the absolute value of the elongation filtered displacement rate $S3_F$, the elongation damping force De of the electric motor 35 increases. The ratio (inclination) of the increment of the elongation damping force De relative to the increment of the absolute value of the filtered displacement rate $S3_F$ is changed with the absolute value of the filtered displacement rate $S3_F$, and a inclination at a side where the absolute value of the filtered displacement rate $S3_F$ is set to be smaller than a inclination in a predetermined range of the absolute value of the filtered displacement rate $S3_F$ including zero.

As is clear from FIG. 13B, in accordance with the increment of the absolute value of the shrinkage filtered displacement rate $S3_F$, the shrinkage damping force De of the electric motor 35 increases. The ratio (inclination) of the increment of the shrinkage damping force De relative to the increment of the absolute value of the filtered displacement rate $S3_F$ is changed with the absolute value of the filtered displacement rate $S3_F$, and a inclination at a side where the absolute value of the filtered displacement rate $S3_F$ is large is set to be smaller than a inclination in a predetermined range of the absolute value of the filtered displacement rate $S3_F$ including zero. The shrinkage damping force Dc is set to be smaller than the elongation damping force De at the same absolute value of the filtered displacement rate $S3_F$.

Note that the words "elongation damping force De" and "shrinkage damping force Dc" in FIGS. 13A and 13B specifically mean the target value of a current generated by regenerative electric generation by the electric motor 35, and a target current value to be generated in regenerative electric generation for both elongation and shrinkage will be collectively described as a "target damping force Dt".

As is clear from FIG. 13C, a vehicle speed coefficient Kdv is set to increase in accordance with the vehicle speed VS within a range where the vehicle speed VS is a predetermined value, and is set to be constant at a range where the vehicle speed VS is greater than or equal to the predetermined value.

Note that data shown in FIGS. 13A, 13B, and 13C are written in the ROM of the microcomputer 113 beforehand.

In step S21, first, the differentiating unit 202a calculates a displacement rate $S_V$ which corresponds to a displacement amount St from the displacement amount detector 80 differentiated with time, and outputs the calculated displacement rate $S_V$ to the low-pass filter computation unit 202b and the high-pass filter computation unit 202c. Next, the low-pass filter computation unit 202b performs low-pass filtering on the signal of the displacement rate $S_V$, and calculates a filtered displacement rate $S1_F$. In this low-pass filtering, the low-pass cutoff frequency set in the step S11 in the flowchart of FIG. 10 is used. The calculated filtered displacement rate $S1_F$ is output to the adder 202d.

Figure 14A:
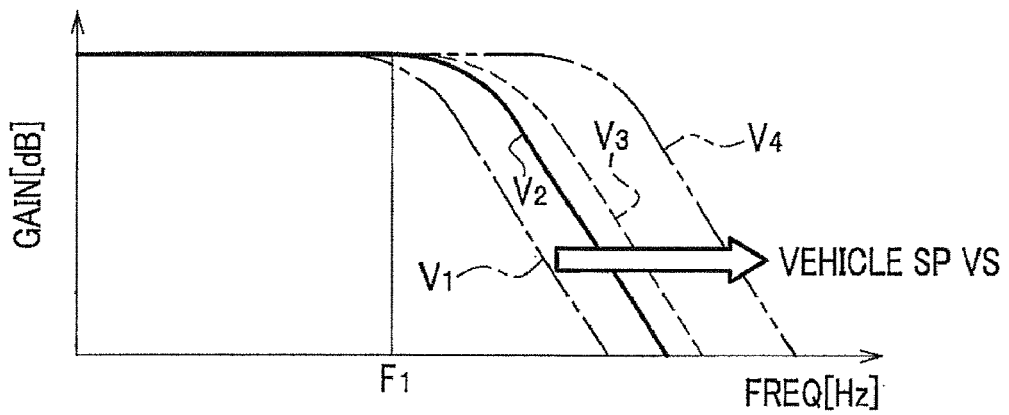
FIG. 14A is a diagram for explaining the frequency characteristic of a low-pass filter computation unit.

With reference to FIG. 14A will be described the frequency characteristic of the low-pass filter computation unit 202b functioning as a digital low-pass filter. FIG. 14A is a diagram for explaining the frequency characteristic of the low-pass filter computation unit, wherein the horizontal axis represents a frequency (Hz) and the vertical axis represents a gain (dB).

Parameters $V_1$, $V_2$, $V_3$ and $V_4$ (the magnitude relation thereof is: $V_1<V_2<V_3<V_4$) in FIG. 14A are vehicle speeds VS when the low-pass cutoff frequency F1 shown in FIG. 11A is exemplarily set, and the frequency characteristics as a digital low-pass filter corresponding to such a vehicle speed are indicated by four curved lines. As the vehicle speed VS becomes large, the low-pass cutoff frequency F1 increases, and there is a transition range in a frequency region beyond the low-pass cutoff frequency F1, and as the frequency increases, the gain decreases.

The high-pass filter computation unit 202c performs high-pass filtering on the signal of the displacement rate $S_V$, and calculates a filtered displacement rate $S2_F$ in step S23. In the high-pass filtering, the high-pass cutoff frequency F2 set in the step S12 in the flowchart of FIG. 10 is used. The calculated filtered displacement rate $S2_F$ is output to the adder 202d.

Figure 14B:
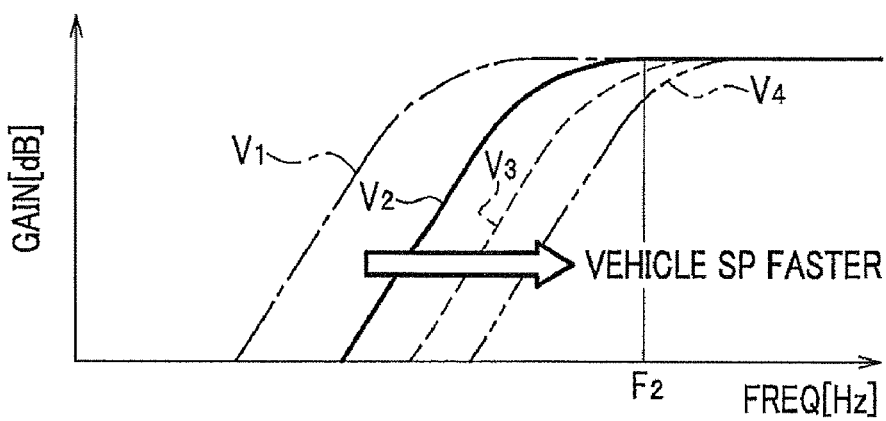
FIG. 14B is a diagram for explaining the frequency characteristic of a high-pass filter computation unit.

The frequency characteristic of the high-pass filter computation unit 202c functioning as a digital high-pass filter will be explained with reference to FIG. 14B. FIG. 14B is a diagram for explaining the frequency characteristic of the high-pass filter computation unit, wherein the horizontal axis represents a frequency (Hz) and the vertical axis represents a gain (dB).

Parameters $V_1$, $V_2$, $V_3$ and $V_4$ (the magnitude relation thereof is: $V_1<V_2<V_3<V_4$) in FIG. 14B are vehicle speeds VS when the high-pass cutoff frequency F2 shown in FIG. 11B is exemplarily set, and the frequency characteristics as a digital high-pass filter corresponding to such a vehicle speed are indicated by four curved lines. As the vehicle speed VS becomes large, the high-pass cutoff frequency F2 increases, and the gain is constant at a frequency region greater than or equal to the high-pass cutoff frequency F2. There is a transition range in a frequency region below the high-pass cutoff frequency F2, and as the frequency decreases, the gain also decreases.

The adder 202d adds the filtered displacement rates $S1_F$ and $S2_F$ calculated in the steps S22 and S23 ($S3_F = S1_F + S2_F$) to acquire a filtered displacement rate $S3_F$, and outputs the filtered displacement rate $S3_F$ to the damper control amount computation unit 202e in step S24.

Figure 14C:
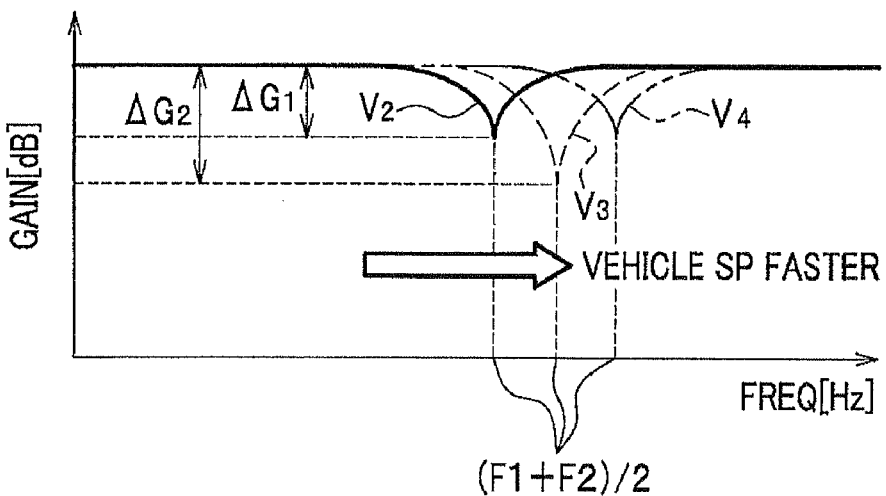
FIG. 14C is a diagram for explaining the frequency characteristic at the stage where the displacement rate is the filtered displacement rate $S3_F$ acquired as a resultant of an addition by an adder.

An explanation will be given of the frequency characteristic at the stage where the displacement rate is the filtered displacement rate $S3_F$ acquired as a resultant of the addition by the adder 202d. In other words, the low-pass cutoff frequency setting unit 203A, the high-pass cutoff frequency setting unit 204A, the low-pass filter computation unit 202b, the high-pass filter computation unit 202c, and the adder 202d form one digital band-stop filter. With reference to FIG. 14C will be described a frequency characteristic of a digital band-stop filter. FIG. 14C is a diagram for explaining the frequency characteristic at the stage where the displacement rate is the filtered displacement rate $S3_F$ acquired as a resultant of the addition by the adder unit, wherein the horizontal axis represents a frequency (Hz) and the vertical axis represents a gain (dB).

In FIG. 14C, when the vehicle speed VS is $V_1$, since the vehicle speed VS is less than $V_a$, the low-pass cutoff frequency F1 and the high-pass cutoff frequency F2 have the same value as shown in FIGS. 11A and 11B, so that the frequency characteristic at the stage where the displacement rate is the filtered displacement rate $S3_F$ acquired through the addition by the adder 202d has a substantially constant gain which is omitted in the figure. When the vehicle speed VS is $V_2$ which is present in the interval between $V_e$ and $V_b$ shown in FIG. 11, since the difference between the low-pass cutoff frequency F1 and the high-pass cutoff frequency F2 is ΔF, the frequency characteristic of the band-stop filter becomes like the curved line of the parameter $V_2$ shown in FIG. 14C where the maximum value $\Delta G_1$ of the amount of decrease in the gain is located at a position where the frequency is (F1+F2)/2. When the vehicle speed VS is $V_3$ which is present in an interval between $V_b$ and $V_d$ shown in FIG. 11, since the difference between the low-pass cutoff frequency F1 and the high-pass cutoff frequency F2 is larger than ΔF, the frequency characteristic of the band-stop filter becomes the curved line of the parameter $V_3$ shown in FIG. 14C where the maximum value $\Delta G_2$ of the amount of decrease in the gain ($\Delta G_1 < \Delta G_2$) is located at a position where the frequency is (F1+F2)/2. When the vehicle speed VS is $V_4$ which is present in an interval greater than or equal to $V_d$ shown in FIG. 11, since the difference between the low-pass cutoff frequency F1 and the high-pass cutoff frequency F2 is ΔF, frequency characteristic of the band-stop filter becomes the curved line of the parameter $V_4$ shown in FIG. 14C where the maximum value $\Delta G_1$ of the amount of decrease in the gain is located at a position where the frequency is (F1+F2)/2.

As explained above, in the interval where the vehicle speed VS is from $V_b$ and $V_d$, the difference between the low-pass cutoff frequency F1 and the high-pass cutoff frequency F2 is set to be larger than ΔF, and as shown in FIG. 14C, at a frequency band in the vicinity of the frequency (F1+F2)/2, the gain is set smaller than that in the other interval where the vehicle speed VS is greater than or equal to $V_e$. As a result, when unbalance wheel vibration in the vicinity of the frequency (F1+F2)/2 causes, for example, the wheel 1 to vibrate in the vertical direction resonantly with the vehicle 2 (see FIG. 1), the absolute value of the filtered displacement rate $S3_F$ used in steps S26 and S28 to be discussed later is set small in order to reduce and weaken the damping force of the electric damper 303 (see FIG. 5, in the figure, denoted as 303FL, 303FR, 303RL, and 303RR).

Next, the damper control amount computation unit 202e determines whether or not the displacement direction is an elongation direction or a shrinkage direction based on the positive/negative code of the filtered displacement rate $S3_F$ in step S25. When the displacement direction is an elongation direction, the flow goes to step S26, and when it is a shrinkage direction, the flow goes to step S28.

Note that when the code of the filtered displacement rate $S3_F$ is positive, it is determined that the displacement direction is an elongation direction, and when the code of the filtered displacement rate $S3_F$ is negative, it is determined that the displacement direction is a shrinkage direction.

In the step S26, the damper control amount computation unit 202e refers to the data shown in FIG. 13A, and searches the elongation damping force De based on a filtered displacement rate $|S3_F|$. Next, the damper control amount computation unit 202e sets the target damping force Dt to De in step S27.

The damper control amount computation unit 202e refers to the data shown in FIG. 13B, and searches the shrinkage damping force De based on a filtered displacement rate $|S3_F|$ in the step S28. Next, the damper control amount computation unit 202e sets the target damping force Dt to −Dc in step S29.

The reason why the target damping force Dt is set to be positive in the step S27 and the target damping force Dt is set to be negative in the step S29 is to determine whether it is an elongation damping force or a shrinkage damping force in a later step S32.

The damper control amount computation unit 202e refers to the data shown in FIG. 13C, and searches a vehicle speed coefficient kdv based on the vehicle speed VS in step S30. In step S31, the damper control amount computation unit 202e multiplies the target damping force Dt set in the step S27 or the step S29 by the vehicle speed coefficient Kdv searched in the step S30, thereby setting a target damping force Dt (Dt=Kdv×Dt).

The driving circuit output unit 207 checks whether or not the target damping force Dt is greater than or equal to zero in the step S32. When the target damping force Dt is greater than or equal to zero (step S32: YES), it is determined as the case of elongation regenerative electric generation, and the flow goes to step S33. When the target damping force Dt is less than zero (step S32: NO), it is determined as the case of shrinkage regenerative electric generation, and the flow goes to step S34.

In the step S33, the drive circuit output unit 207 outputs an instruction to turn OFF the FETs 91A, 91B, and 91C in the bridge circuit 122 shown in FIG. 7A and to drive the FET 91D under PWM control having a duty ratio on the basis of the target damping force Dt to the motor driving unit 106, and PID control is performed in such a way that the detected current value Id (see FIG. 8, in the figure, individually denoted as $Id_{FL}$, $Id_{FR}$, $Id_{RL}$, and $Id_{RR}$) from the motor current sensor 124 matches the target damping force Dt.

The driving circuit output unit 207 sets Dt=−Dt in step S34. In step S35, the driving circuit output unit 207 outputs an instruction to turn OFF the FETs 91B, 91C, and 91D in the bridge circuit 122 as shown in FIG. 7B and to drive the FET 91A under PWM control having a duty ratio based on the target damping force Dt to the motor driving circuit 106, and PID control is performed in such a way that the detected current value Id (see FIG. 8, in the figure, individually denoted as $Id_{FL}$, $Id_{FR}$, $Id_{RL}$, and $Id_{RR}$) from the motor current sensor 124 matches the target damping force Dt.

After the process in the step S33 or the step S35, the flow returns to the step S03 in the main flowchart of FIG. 10.

As explained above, according to the first embodiment, when unbalance wheel vibration causes the wheel 1 to vibrate in the vertical direction, the electric damper 303 sets damping force large to the component of the vertical vibration input to the wheel 1 corresponding to a frequency region smaller than the predetermined low-pass cutoff frequency F1 and a frequency region larger than the predetermined high-pass cutoff frequency F2 set in the vicinity of the frequency of the vertical vibration of the wheel in the vicinity of the frequency of the unbalance wheel vibration, in the components of the displacement rate $S_V$ based on the signal from the displacement amount detector 80. Conversely, the electric damper 303 sets damping force small to the component of the vertical vibration input to the wheel 1 corresponding to a frequency region between the low-pass cutoff frequency F1 and the high-pass cutoff frequency F2. The frequency region where the damping force is set small can be variably set in accordance with the frequency of the unbalance wheel vibration changing in accordance with the vehicle speed VS.

In other words, when the unbalance wheel vibration causes the wheel 1 to vibrate in the vertical direction, the electric damper 303 sets damping force small to the component corresponding to the frequency band of the vertical vibration of the wheel 1 in the vicinity of the frequency of the unbalance wheel vibration, in the components of the displacement rate $S_V$ based on the signal from the displacement amount detector 80. The frequency band in which the damping force is set small can be variably set in accordance with the frequency of the unbalance wheel vibration changing in accordance with the vehicle speed VS.

Therefore, transmission of the unbalance wheel vibration to the vehicle body 6 is reduced. As a result, it is possible to prevent a driver or a passenger from feeling uncomfortable as the unbalance wheel vibration is transmitted to the vehicle body 6, and it is possible to eliminate the unbalance wheel vibration, which disturbs the driver in figuring out information on a road that the vehicle is running, from vehicle body vibration.

In particular, even if the electric damper 303 is set to have a hard ride comfort characteristic which is preferably for sporty cars, it is possible to suppress any transmission of the unbalance wheel vibration to the vehicle body 6.

Moreover, as shown in FIG. 14C, regarding the frequency characteristic as a digital band-stop filter, the band-stop frequency band and the amount of decrease in the gain can be variably set in accordance with the vehicle speed VS, so that the electric damper 303 can control the damping force in consideration of a change in a frequency and a change in the amplitude of unbalance wheel vibration to suppress any transmission of the unbalance wheel vibration to the vehicle body 6.

According to the first embodiment, because of the computation through the low-pass filter computation unit 202b, the high-pass filter computation unit 202c and the adder 202d, the displacement rate $S_V$ may have a phase-lag, but as such a phase-lag is appropriately compensated at the following stage of the adder 202d, it is possible to appropriately perform damper control so as to suppress any vertical movement of the wheel 1 and the vertical movement of the vehicle body 6.

Regarding the frequency characteristic of the low-pass filter computation unit 202b, as shown in FIG. 14A, the gain is set to be constant when the frequency is less than or equal to the low-pass cutoff frequency F1, and regarding the frequency characteristic of the high-pass filter computation unit 202c, as shown in FIG. 14B, the gain is set to be constant when the frequency is greater than or equal to the high-pass cutoff frequency F2, but the present invention is not limited to such a setting.

For example, the gain in a predetermined frequency region which is not related to unbalance wheel vibration, e.g., a frequency region from 3 Hz to 8 Hz, may be set large to increase the damping force of the electric damper 303.

In the first embodiment, the function as the band-stop filter having a band-stop cutoff frequency variably settable is realized using all of the low-pass cutoff frequency setting unit 203A, the high-pass cutoff frequency setting unit 204A, the low-pass filter computation unit 202b, the high-pass filter computation unit 202c, and the adder 202d, but the present invention is not limited to such a structure. A band-stop lower-side cutoff frequency setting unit may be used instead of the low-pass cutoff frequency setting unit 203A and a band-stop upper-side cutoff frequency setting unit may be used instead of the high-pass cutoff frequency setting unit 204A, and all of such setting units, the low-pass filter computation unit 202b, the high-pass filter computation unit 202c and the adder 202d may be collectively used as a single band-stop filter. In this case, the frequency characteristic of the digital band-stop filter can have the band-stop frequency band and the amount of decrease in the gain variably settable in accordance with the vehicle speed VS.

Second Embodiment

Next, with reference to FIGS. 15 to 20 and also FIG. 1 accordingly, an explanation will be given of an electric damper according to the second embodiment of the present invention.

In the second embodiment, a control ECU 200B has a control function of an electric power steering in addition to the functions of the control ECU 200A of the electric damper of the first embodiment. In the control ECU 200B, an output signal (steering wheel torque detection signal) from a torque sensor (steering wheel torque sensor) 17 is used for controlling the damping force of an electric damper.

The control ECU 200B also has a function as a "control device that controls an electric motor of an electric power steering device" recited in claims.

Figure 15:
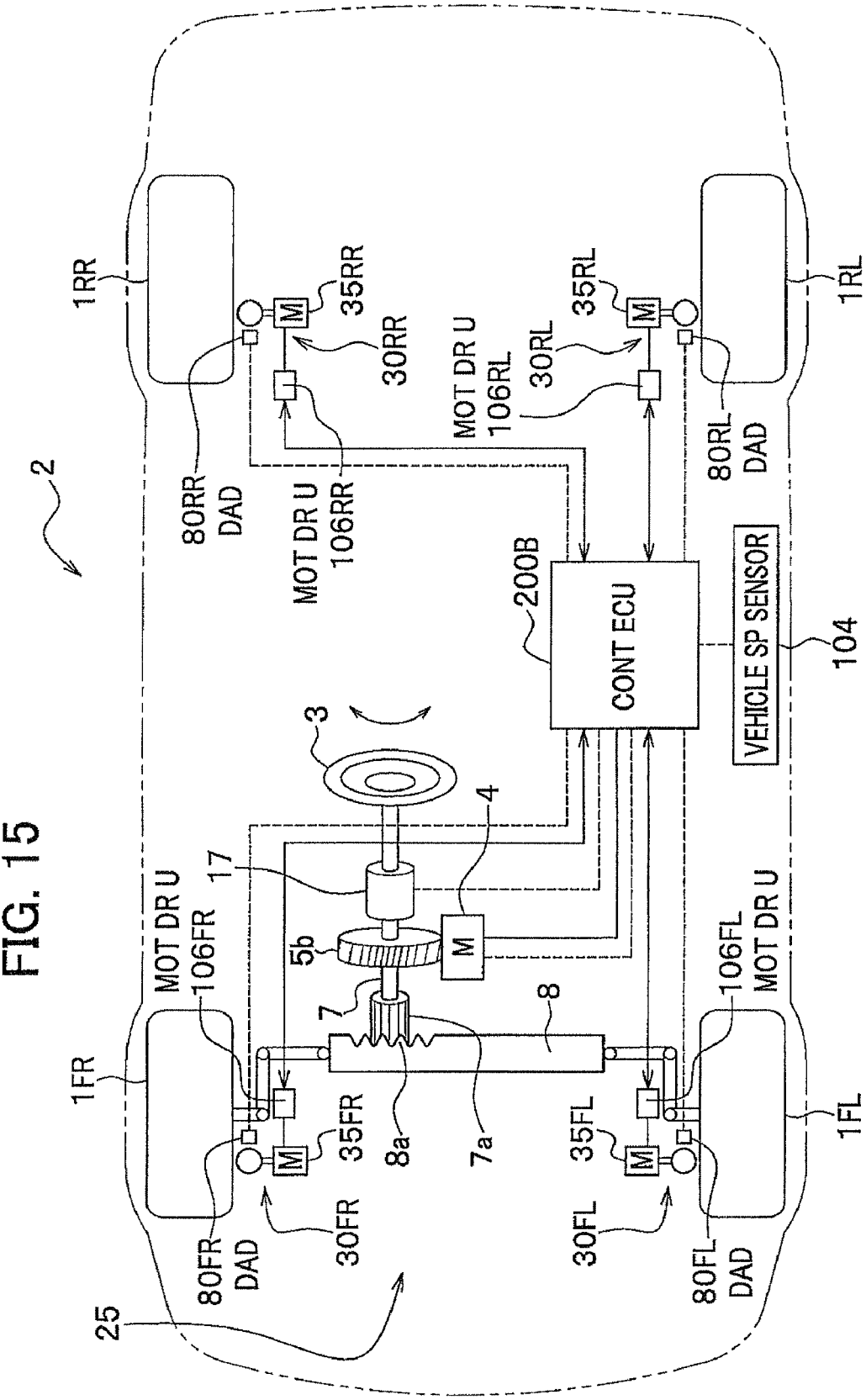
FIG. 15 is a layout drawing showing the major components of a vehicle in which an electric damper of the second embodiment of the present invention is combined with an electric power steering device.

FIG. 15 is a layout drawing showing the major components of a vehicle in which an electric damper of the second embodiment of the present invention is combined with an electric power steering device.

The same structural components as those of the first embodiment will be denoted by the same reference numbers, and the duplicated explanations thereof will be omitted.

As shown in FIG. 15, a rack gear 8a which steers right and left front wheels 1FL and 1FR is engaged with a pinion gear 7a, and the handle shaft of a steering wheel 3 is coupled to a rack shaft 8 of the rack gear 8a through a no-illustrated universal joint. Provided between the steering wheel 3 and the pinion gear 7a are the torque sensor 17 and a worm wheel gear 5b, which receives driving force from an electric motor applying steering auxiliary force to the pinion shaft 7, and form an electric power steering mechanism 25 which is a mechanical component of the electric power steering device.

As shown in FIGS. 1 and 15, according to the second embodiment, an output signal from the torque sensor 17 is input into the control ECU 200B. As shown in FIG. 15, the electric motor 4 is controlled by the control ECU 200B based on signals from the vehicle speed sensor 104, the torque sensor 17, and the like.

The detailed structure of the electric power steering mechanism 25 is well-known to those skilled in the art, so that the explanation thereof will be omitted.

The suspension devices 14FL, 14FR, 14RL, and 14RR (see FIG. 1) provided for the respective wheels 1FL, 1FR, 1RL, and 1RR have the electric damper conversion mechanisms (conversion mechanism) 30FL, 30FR, 30RL, and 30RR, respectively. The electric damper conversion mechanisms 30FL, 30FR, 30RL, and 30RR respectively have damper electric motors 35FL, 35FR, 35RL, and 35RR each controlled by the control ECU 200B. The suspension devices 14FL, 14FR, 14RL, and 14RR (see FIG. 1) are respectively provided with the displacement amount detectors 80FL, 80FR, 80RL, and 80RR each of which detects the vertical displacement amount of each wheel 1FL, 1FR, 1RL, and 1RR, and the output signal thereof is input into the control ECU 200B.

The detailed structures of the individual electric damper conversion mechanisms 30FL, 30FR, 30RL, and 30RR are the same as those explained in the first embodiment.

For example, when the front wheels 1FL, 1FR have unbalance wheel vibrations, the vibrations are transmitted via a steering knuckle (reference number omitted), tie-rods (reference numbers omitted), the rack shaft 8, and the pinion shaft 7 all shown in FIG. 15, so that the components of such vibrations are contained in a steering wheel torque detection signal output from the torque sensor 17. Since unbalance wheel vibration differs depending on the type of a wheel to be attached, the wearing of the attached tire, and the like, it is desirable to control the damper characteristic by detecting actual wheel vibration so as not to transmit the unbalance wheel vibration to the vehicle body 6 (see FIG. 1). In particular, in front-wheel-drive vehicles, wearing of the front wheels 1FL, 1FR advance faster than the rear wheels 1RL, 1RR, so that it is desirable to control the damper characteristics of the electric dampers 303FL, 303FR (see FIG. 16) for the front wheels 1FL, 1FR in accordance with a change in unbalance wheel vibration due to tire wearing.

The characteristic of the second embodiment is to control the damper characteristic in accordance with a change in the level of such unbalance wheel vibration.

Figure 16:
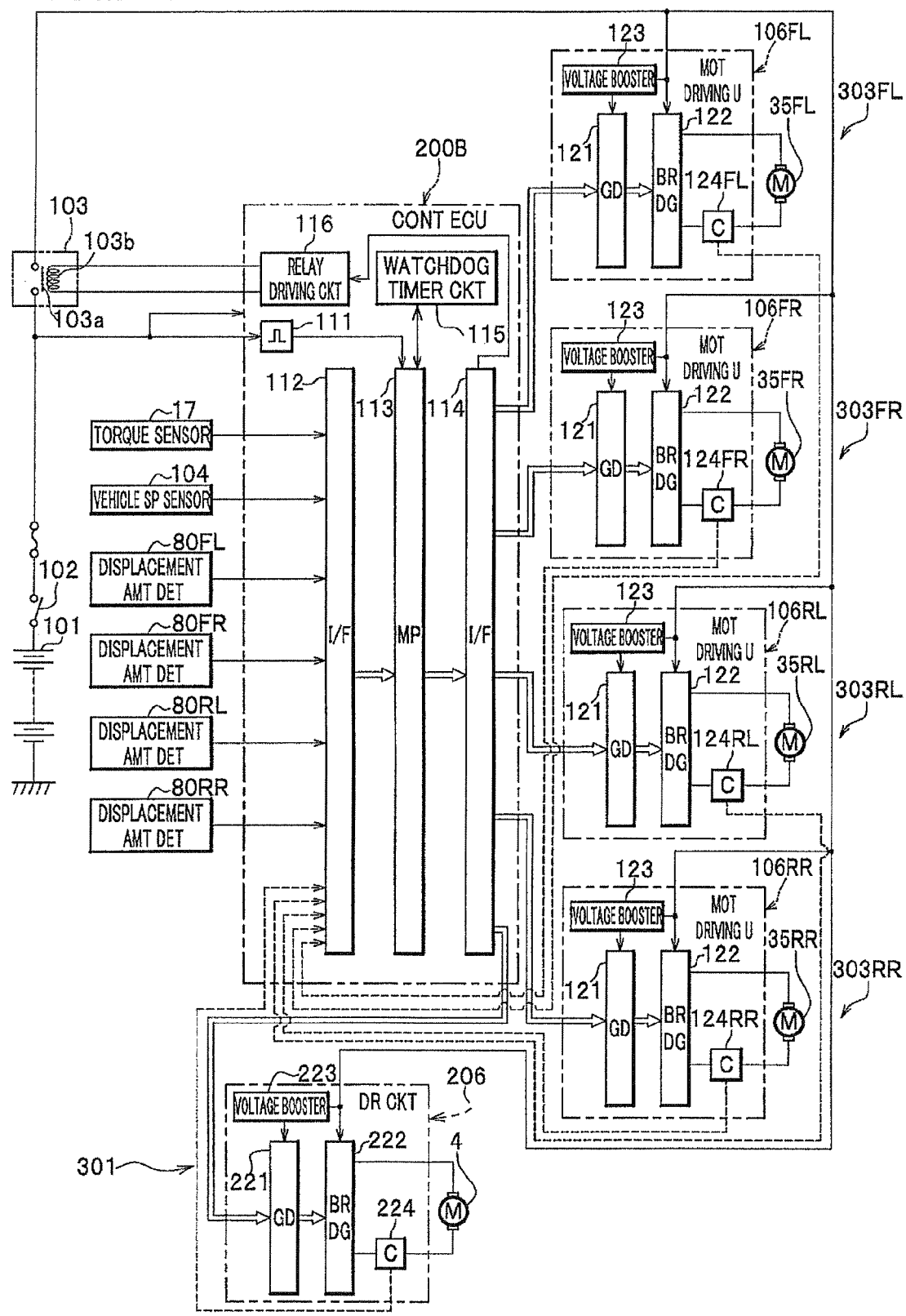
FIG. 16 is a block diagram showing the structures of the control circuit and electric motor driving circuit of the electric power steering device and the electric damper.

FIG. 16 is a block diagram showing the structures of the control circuit and electric motor driving circuit of the electric power steering device and the electric damper. The characteristic of the second embodiment is that the electric dampers 303 (in FIG. 16, denoted as 303FL, 303FR, 303RL, and 303RR) and the electric power steering device 301 shear the control ECU 200B.

The control ECU 200B further controls a motor driving circuit (driving circuit) 206 which drives the electric motor 4. The electric motor 4 comprises, for example, a DC motor with a brush. The motor driving circuit 206 has a gate driving circuit 221, a bridge circuit 222, a voltage booster 223, a motor current sensor 224, and has basically the same structure as that of the motor driving circuit 106.

Figure 17:
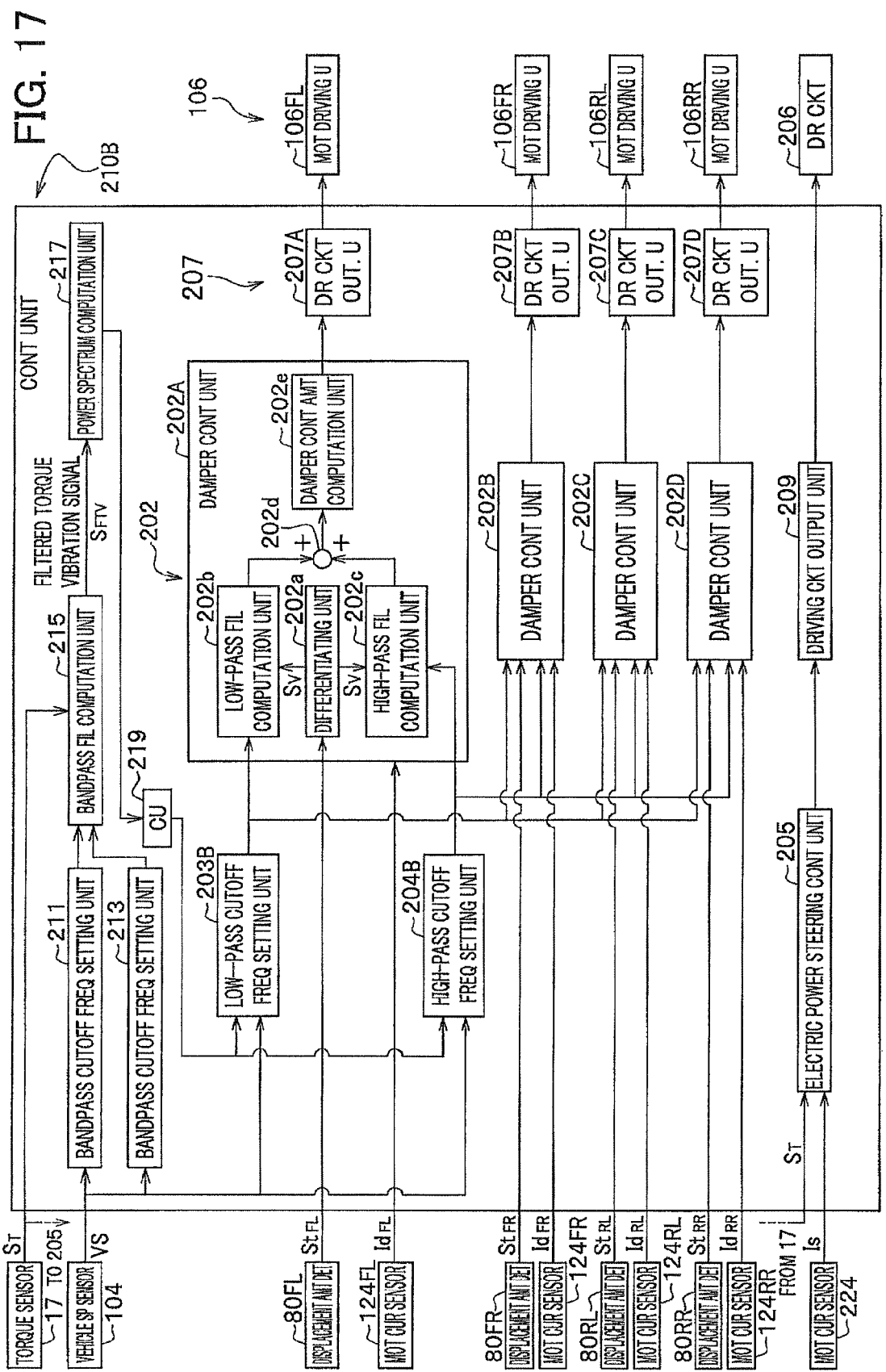
FIG. 17 is a control-function block diagram showing the electric power steering device and the electric damper.

FIG. 17 is a control-function block diagram showing the electric power steering device and the electric damper. The difference from the first embodiment is that the second embodiment employs an electric power steering control unit 205, which sets a target current value based on a signal (steering wheel torque detection signal $S_T$) from the torque sensor 17 and a signal (current signal $I_S$) from the motor current sensor (GD) 224 for fundamentally controlling the electric power steering device, a driving circuit output unit 209, which outputs a gate control signal to the gate driving circuit 221 (see FIG. 16) of the motor driving circuit 206 driving the electric motor 4 of the electric power steering device in accordance with a target current value, a low-pass cutoff frequency setting unit 203B, a high-pass cutoff frequency setting unit 204B, a bandpass cutoff frequency setting unit 211, a bandpass cutoff frequency setting unit 213, a bandpass filter computation unit 215, a power spectrum computation unit 217 and a frequency-offset-amount computation unit (CU) 219 which are the characteristic components of the second embodiment.

The functions of the electric power steering control unit 205 and the driving circuit output unit 209 are well-known to those skilled in the art and are not related to the present invention, so that the detailed explanation thereof will be omitted.

The bandpass cutoff frequency setting unit 211, the bandpass cutoff frequency setting unit 213, and the bandpass filter computation unit 215 forms a digital bandpass filter having a cutoff frequency variably settable.

Figure 18A:
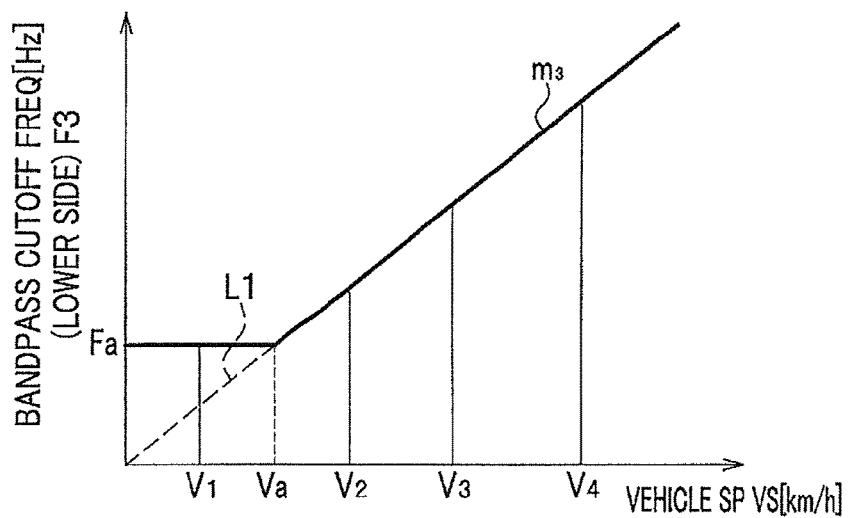
FIG. 18A is a diagram showing a function for setting the lower limit cutoff frequency (lower limit side) for a digital bandpass filter.

The bandpass cutoff frequency setting unit 211 sets a lower-side cutoff frequency (hereinafter, "bandpass cutoff frequency (lower limit side)") F3 in accordance with a vehicle speed VS as shown in FIG. 18A for extracting the component of unbalance wheel vibration contained in the vibration frequency component of a steering wheel torque detection signal $S_T$ output from the torque sensor 17 at the bandpass filter computation unit 215.

The bandpass cutoff frequency setting unit 213 sets a bandpass cutoff frequency (lower limit side) F3 with reference to the vehicle speed VS based on, for example, a lookup table or a function (see FIG. 18A), stored in the flash memory of the microcomputer 113 (see FIG. 16) beforehand and for setting the bandpass cutoff frequency (lower limit side) with the vehicle speed being a parameter.

Figure 18B:
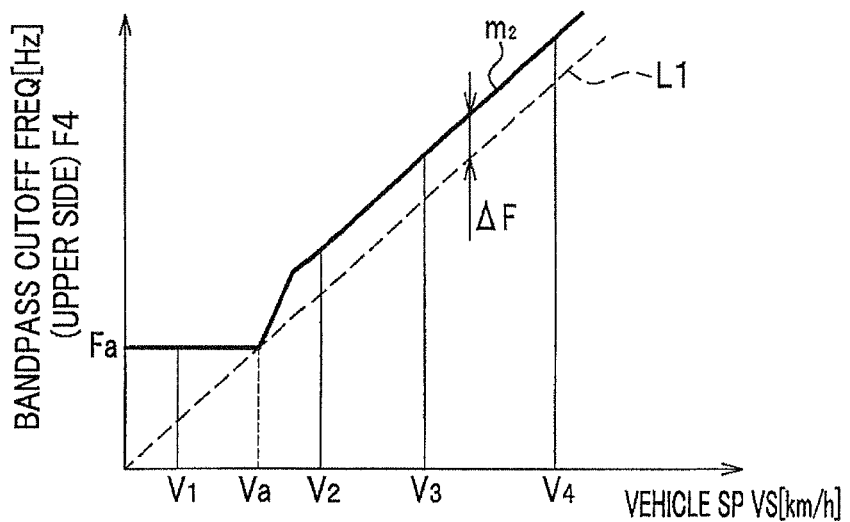
FIG. 18B is a diagram showing a function for setting a bandpass cutoff frequency (upper limit side) for a digital bandpass filter.

The bandpass cutoff frequency setting unit 213 also sets an upper-side cutoff frequency (hereinafter, "bandpass cutoff frequency (upper limit side)") F4 in accordance with the vehicle speed VS as shown in FIG. 18B for extracting the component of unbalance wheel vibration at the bandpass filter computation unit 215.

The bandpass cutoff frequency setting unit 213 sets a bandpass cutoff frequency (upper limit side) F4 with reference to the vehicle speed VS based on, for example, a lookup table or a function (see FIG. 18B), stored in the flash memory of the microcomputer 113 (see FIG. 16) beforehand and for setting the bandpass cutoff frequency (upper limit side) with the vehicle speed being a parameter.

When primary vibration of unbalance wheel vibration is present, the component of the unbalance wheel vibration contained in a steering wheel torque detection signal $S_T$ has a frequency which increases in accordance with the vehicle speed VS.

FIG. 18A is a diagram showing a function for setting a bandpass cutoff frequency (lower limit side) for a digital bandpass filter, wherein the horizontal axis represents a vehicle speed VS (km/h) and the vertical axis represents a low-pass cutoff frequency (Hz).

A curved line $m_3$ of the function is set based on a straight line L1 passing through the origin and indicated by a dashed line having a predetermined inclination. When the vehicle speed VS is less than a vehicle speed $V_a$, the corresponding portion of the curved line is a constant bandpass cutoff frequency (lower limit side) $F_a$, and when the vehicle speed VS is greater than or equal to $V_a$, the corresponding portion of the curved line is the straight line L1.

FIG. 18B is a diagram showing a function for setting a bandpass cutoff frequency (upper limit side) for a digital bandpass filter, wherein the horizontal axis represents a vehicle speed VS (km/h) and the vertical axis represents a bandpass cutoff frequency (upper limit side) F4 (Hz).

The curved line of the function is the same as, for example, one shown in FIG. 11B, and the detailed explanation thereof will be omitted.

Figure 18C:
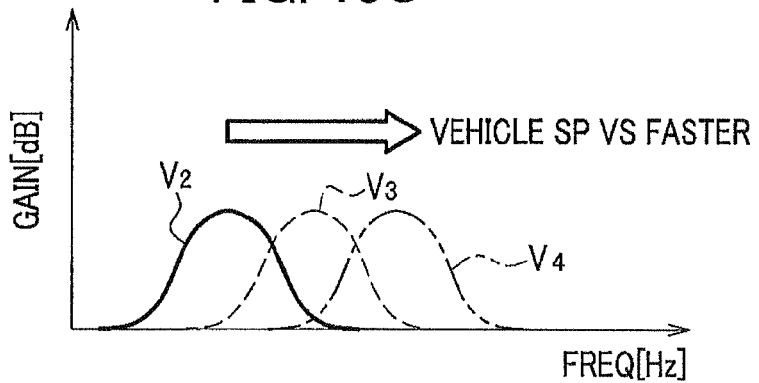
FIG. 18C is a diagram for explaining the frequency characteristic of a filtered torque vibration signal $S_{FTV}$ which is a resultant of a filtering computation performed on a steering wheel torque detection signal $S_T$ by a bandpass filter computation unit.

FIG. 18C is a diagram for explaining the frequency characteristic of a filtered torque vibration signal $S_{FTV}$ which is a resultant of a filtering computation performed on a steering wheel torque detection signal $S_T$ by the bandpass filter computation unit 215, wherein the horizontal axis represents a frequency (Hz) and the vertical axis represents a gain (dB). As the vehicle speed VS increases, the lower limit side and the upper limit side of the cutoff frequency of the bandpass filter changes while moving in parallel, and the gain characteristic remains the same.

Figure 19A:
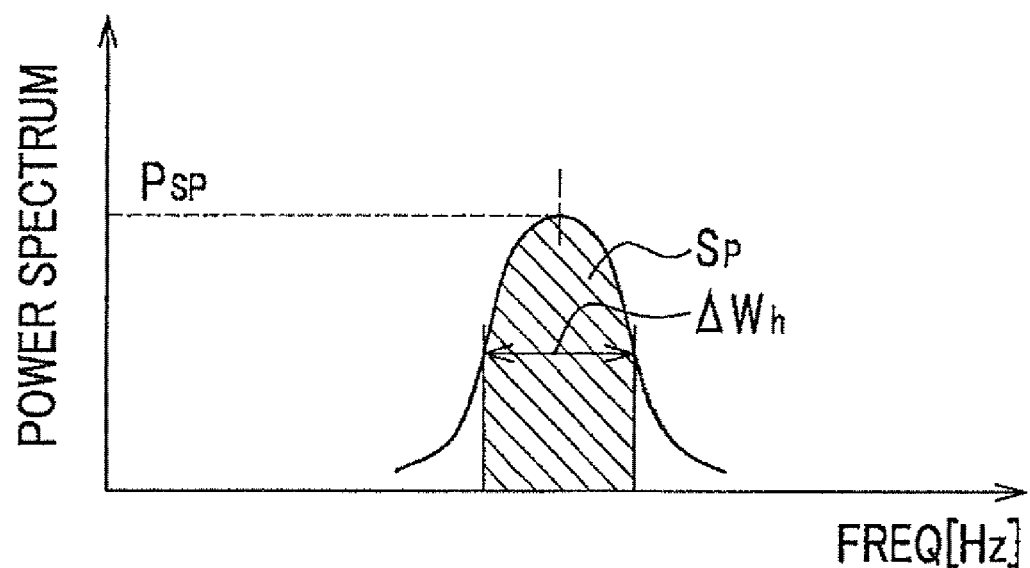
FIG. 19A is a diagram for explaining how to acquire overall power.
Figure 19B:
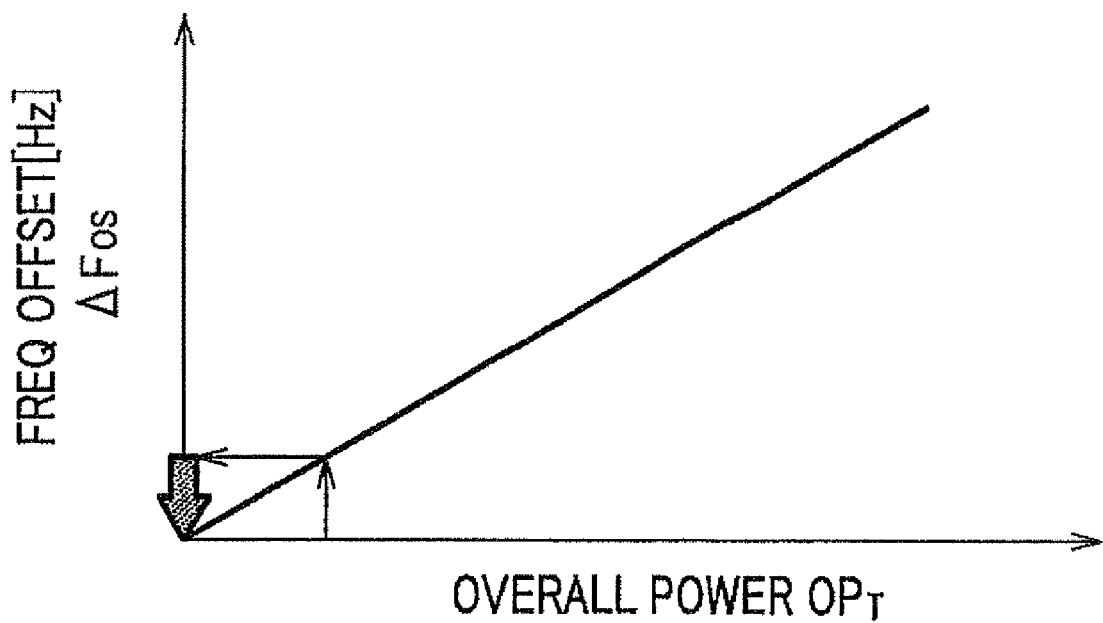
FIG. 19B is a diagram for explaining how to set a frequency offset.

The power spectrum computation unit 217 calculates a power spectrum of a filtered torque vibration signal $S_{FTV}$, and outputs the calculated power spectrum to the frequency-offset-amount computation unit 219. The frequency-offset-amount computation unit 219 calculates, for example, an area of the half value width of the power spectrum of the filtered torque vibration signal $S_{FTV}$ at a peak $P_{SP}$ as shown in FIG. 19A, i.e., overall power $OP_T$, sets a frequency offset $\Delta F_{OS}$ with reference to the overall power $OP_T$ based on, for example, a lookup table or a function (see FIG. 19B), stored in the flash memory of the microcomputer 113 (see FIG. 16) beforehand and for setting the frequency offset $\Delta F_{OS}$ with the overall power $OP_T$ being a parameter, and outputs the frequency offset $\Delta F_{OS}$ to the low-pass cutoff frequency setting unit 203B and the high-pass cutoff frequency setting unit 204B.

The structures of the low-pass cutoff frequency setting unit 203B and the high-pass cutoff frequency setting unit 204B are the same as those in the first embodiment, and respectively set a low-pass cutoff frequency F1 and a high-pass cutoff frequency F2 having an offset by what corresponds to $\Delta F_{OS}$ with reference to the vehicle speed VS based on, for example, a lookup table or a function (see FIGS. 20A, 20B), stored in the flash memory of the microcomputer 113 (see FIG. 16) beforehand and for setting the cutoff frequency of a low-pass filter or a high-pass filter with the vehicle speed BS being a parameter.

At this time, the low-pass cutoff frequency setting unit 203B sets the low-pass cutoff frequency F1 shifted to a lower side by $\Delta F_{OS}$ and the high-pass cutoff frequency setting unit 204B sets the high-pass cutoff frequency shifted to a higher side by $\Delta F_{OS}$.

The low-pass cutoff frequency F1 set by the low-pass cutoff frequency setting unit 203B is output to the low-pass filter computation unit 202b, and a displacement rate $S_V$ is subjected to low-pass filtering based on the low-pass cutoff frequency. The high-pass cutoff frequency set by the high-pass cutoff frequency setting unit 204B is output to the high-pass filter computation unit 202c, and a displacement rate $S_V$ is subjected to digital high-pass filtering based on the high-pass cutoff frequency. The structure that both resultants are added together at the adder 202d and output to the damper control amount computation unit 202e is the same as that of the first embodiment.

Figure 20A:
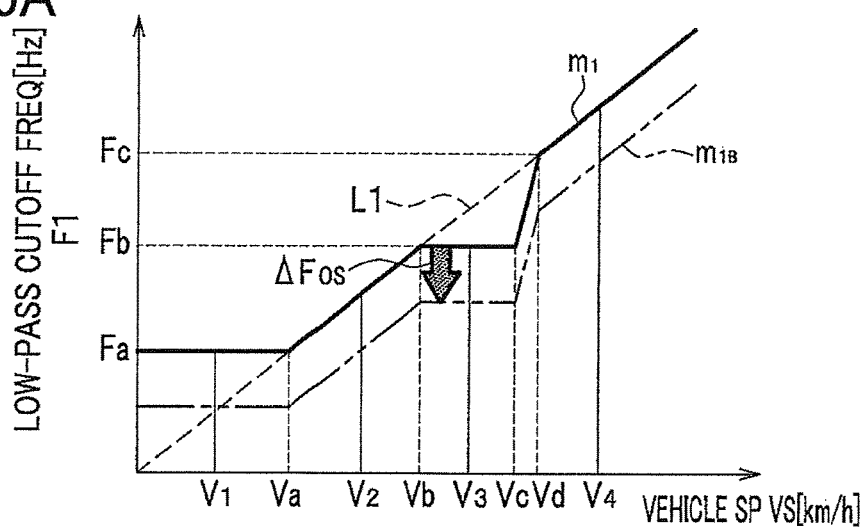
FIG. 20A is a diagram for explaining how to set a cutoff frequency of a digital low-pass filter.
Figure 20B:
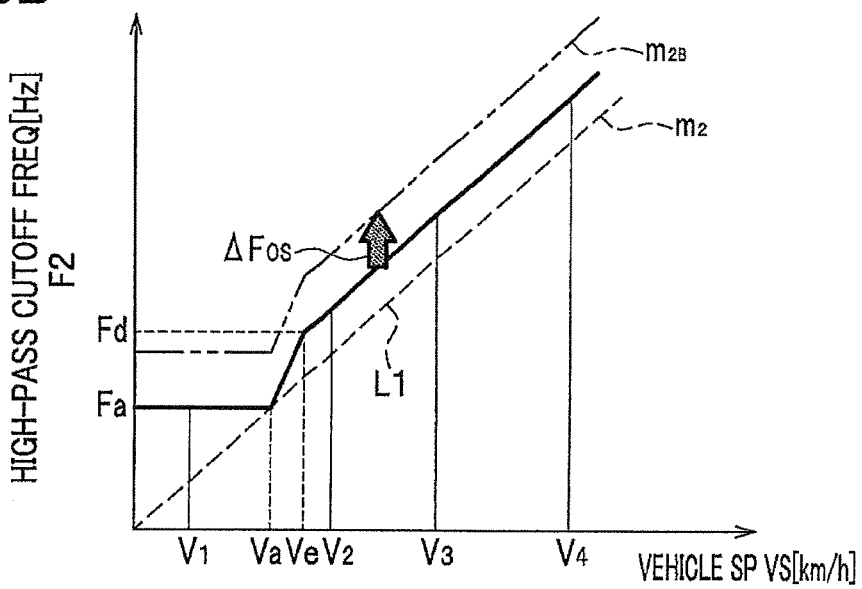
FIG. 20B is a diagram for explaining how to set a cutoff frequency of a digital high-pass filter.
Figure 20C:
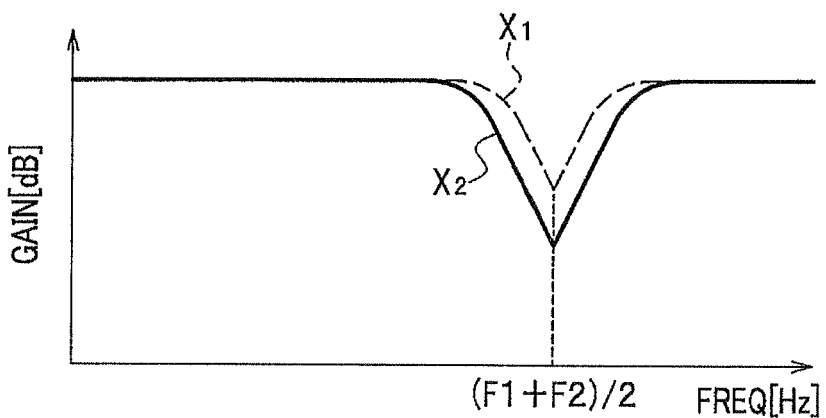
FIG. 20C is a diagram showing the frequency characteristic of a signal having undergone digital band-stop filtering.
Figure 22A:
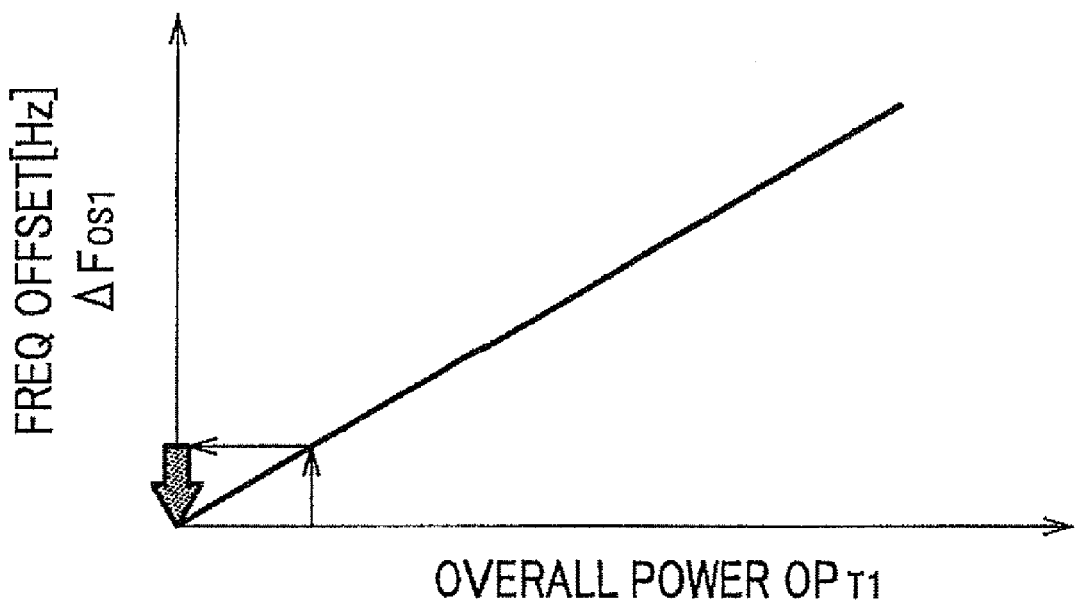
FIGS. 22A and 22B are diagrams for explaining how to set a frequency offset, wherein FIG. 22A corresponds to primary vibration in unbalance wheel vibration, and FIG. 22B corresponds to secondary vibration in unbalance wheel vibration.
Figure 22B:
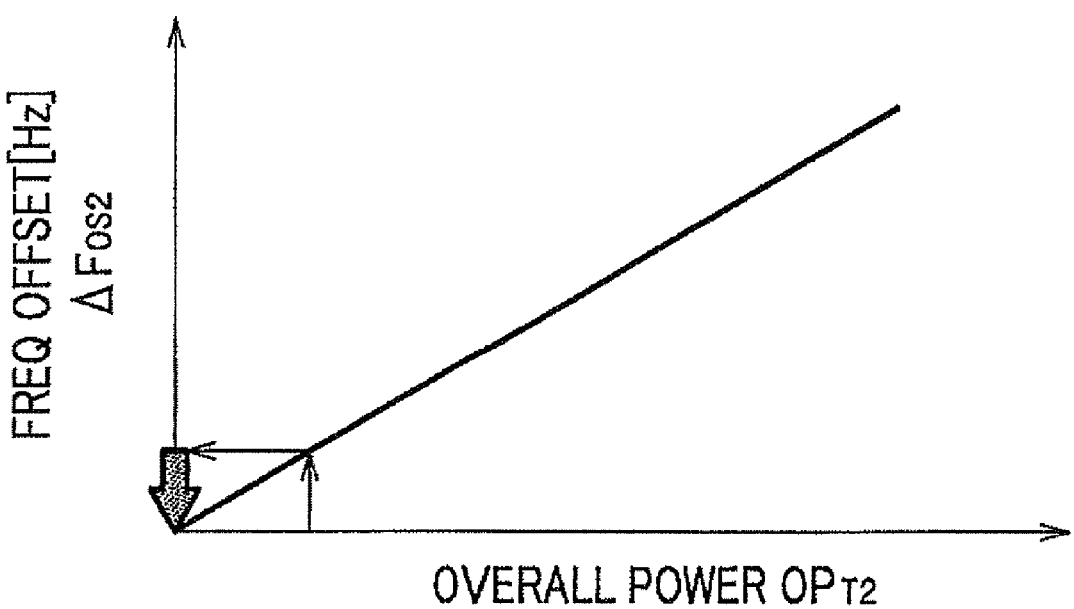

As a result, the frequency characteristic of a filtered displacement rate $S3_F$ input into the damper control amount computation unit 202e corresponds to one computed by a digital band-stop filter as shown in FIG. 20C. When the overall power $OP_T$ is small, it becomes a frequency characteristic as indicated by a curved line $X_1$, and conversely, when the overall power $OP_T$ is large, it becomes a frequency characteristic indicated by a curved line $X_2$. That is, the larger the vibration component of unbalance wheel vibration contained in the steering wheel torque detection signal $S_T$ from the torque sensor 17 is, the stronger the band-stop at a frequency (F1+F2)/2 corresponding to the unbalance wheel vibration frequency becomes, and damping force in damper controlling is reduced so as to be small to such a frequency.

This results in suppression of any transmission of the unbalance wheel vibration of the vehicle body 6.

Note that the overall power $OP_T$ corresponds to the magnitude of vibration recited in claims.

Therefore, it is not necessary to shift the low-pass cutoff frequency F1 from the strait line L1 in an interval where the vehicle speed VS is $V_b$ to $V_d$, and when the vehicle speed VS is greater than or equal to $V_a$, it can be a simple function which is the straight line L1. When unbalance wheel vibration becomes large due to the sympathetic vibration of the wheel 1 with the vehicle 2 (see FIG. 1), as the frequency offset $\Delta F_{OS}$ is in consideration at the low-pass cutoff frequency setting unit 203B and the high-pass cutoff frequency setting unit 204B, damping force is automatically reduced.

According to the second embodiment, the component of actual unbalance wheel vibration contained in a steering wheel torque detection signal $S_T$ output from the torque sensor 17 is extracted, and in accordance with the magnitude of the unbalance wheel vibration, the signal of the displacement rate $S_V$ can be subjected to band-stopping to reduce the gain relative to a frequency band corresponding to the unbalance wheel vibration of the vertical movement of the wheel 1 having a frequency changing in accordance with the vehicle speed VS. As a result, it is possible to flexibly cope with a change in the unbalance wheel vibration due to a change of wheel or tire and a change in the unbalance wheel vibration due to tire wearing, and the like, and it is possible to control the damper characteristic so as not to transmit the unbalance wheel vibration to the vehicle body 6. In particular, in front-wheel-drive vehicles, wearing of the front wheel 1FL or 1FR advances fast in comparison with the rear wheel 1RL or 1RR, but it is possible to control the damper characteristic in accordance with a change in the unbalance wheel vibration due to tire wear.

Third Embodiment

Next, an explanation will be given of an electric damper according to the third embodiment of the present invention with reference to FIGS. 21 to 24.

The third embodiment is made based on the second embodiment, and the difference from the second embodiment is to acquire both frequency of unbalance wheel vibration and magnitude thereof from the component of the unbalance wheel vibration contained in a steering wheel torque detection signal $S_T$ output from the torque sensor 17.

In order to do so, as shown in FIG. 21, a control unit (damping unit) 210C has a power spectrum computation unit 212 and an unbalance wheel vibration detection unit (unbalance-wheel-vibration-frequency acquiring unit) 214, instead of the bandpass cutoff frequency setting units 211, 213, the bandpass filter computation unit 215, the power spectrum computation unit 217 and the frequency offset amount computation unit 219 in the second embodiment. Instead of the low-pass cutoff frequency setting unit 203B and the high-pass cutoff frequency setting unit 204B in the second embodiment, a primary vibration band-stop frequency setting unit 203C and a secondary vibration band-stop frequency setting unit 204C are provided.

The control unit 210C has damper control units 202' instead of the damper control units 202 of the second embodiment.

The damper control unit 202' has the same structure as that of the damper control unit 202 of the second embodiment, and the low-pass filter computation unit 202b, the high-pass filter computation unit 202c and the adder 202d realizes the band-stop function for one frequency band in the second embodiment, however, in the third embodiment, one band-stop filter computation unit 202f realizes such a function. Unlike the second embodiment, the band-stop filer computation unit 202f has band-stop functions for two frequency bands.

Note that the word damper control unit 202' is a collective term for four damper control units 202A', 202B', 202C' and 202D' provided for controlling the respective electric motors 35FL, 35FR, 35RL, and 35RR.

The power spectrum computation unit 212 calculates a power spectrum of a steering wheel torque detection signal $S_T$ from the torque sensor 17 at a predetermined period, and acquires the power spectrum of the steering wheel torque detection signal $S_T$ in accordance with a driving condition at that time. The unbalance wheel vibration detection unit 214 extracts the components of, for example, primary vibration and secondary vibration of unbalance wheel vibration from the power spectrum acquired by the power spectrum computation unit 212 in accordance with a vehicle speed VS acquired by the vehicle speed sensor 104, acquires a primary vibration frequency $F_{V1}$, a secondary vibration frequency $F_{V2}$ and overall powers (magnitude of vibration) $OP_{T1}$, $OP_{T2}$ thereof to be discussed later, and outputs the frequencies to the primary vibration band-stop frequency setting unit 203C and the secondary vibration band-stop frequency setting unit 204C. The primary vibration band-stop frequency setting unit 203C and the secondary vibration band-stop frequency setting unit 204C set frequency offsets $\Delta F_{OS1}$, $\Delta F_{OS2}$ in accordance with the magnitude of the vibrations as shown in FIG. 22 relative to the input frequencies $F_{V1}$, $F_{V2}$, thereby setting respective cutoff frequencies of band-stop filters for the primary vibration frequency $F_{V1}$, and the secondary vibration frequency $F_{V2}$.

Next, an explanation will be given in detail of the operations of the power spectrum computation unit 212, the unbalance wheel vibration detection unit 214, the primary vibration band-stop frequency setting unit 203C and the secondary vibration band-stop frequency setting unit 204C of the third embodiment.

Figure 23:
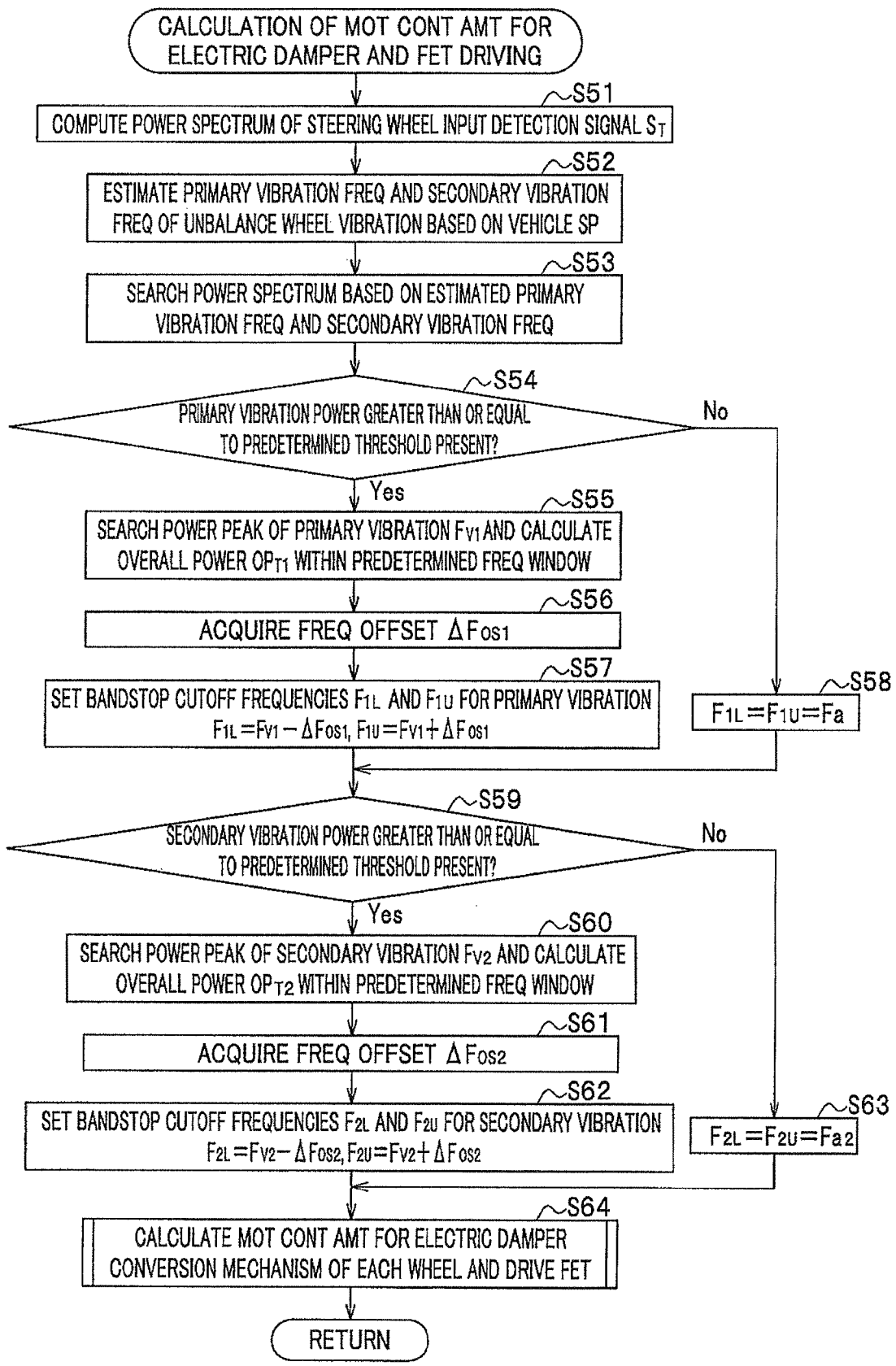
FIG. 23 is a main flowchart for calculation of a motor control amount and controlling of an FET driving in an electric damper.

FIG. 23 is a main flowchart for calculation of a motor control amount and controlling of an FET driving in the electric damper according to the third embodiment.

The power spectrum computation unit 212 calculates the power spectrum of a steering wheel torque detection signal $S_T$ input from the torque sensor 17 in step S51.

The unbalance wheel vibration detection unit 214 estimates the primary vibration frequency and secondary vibration frequency of unbalance wheel vibration based on a vehicle speed VS in step S52. Regarding the unbalance wheel vibration, the primary vibration frequency thereof can be estimated from the outer diameter of the wheel and the vehicle speed VS, and the secondary vibration frequency can be easily estimated since the secondary vibration frequency is twice as much as the primary vibration frequency.

In step S53, based on the primary vibration frequency and secondary vibration frequency estimated in the step S52, the unbalance wheel vibration detection unit 214 searches a power spectrum acquired in the step S51 within a predetermined frequency window around the estimated primary and secondary vibration frequencies.

The unbalance wheel vibration detection unit 214 checks whether or not there is power of the primary vibration greater than or equal to a predetermined threshold in step S54. When there is power of the primary vibration greater than or equal to the predetermined threshold (step S54: YES), the flow goes to step S55, and when there is no such power, the flow goes to step S58.

In the step S55, the unbalance wheel vibration detection unit 214 detects the power peak of the primary vibration frequency $F_{V1}$, and calculates overall power $OP_{T1}$ within a predetermined frequency window. Next, in step S56, the unbalance wheel vibration detection unit 214 acquires a frequency offset $\Delta F_{OS1}$ with reference to the overall power $OP_{T1}$ based on, for example, a lookup table or a function (see FIG. 22A), stored in the flash memory of the microcomputer 113 (see FIG. 16) beforehand and for setting the frequency offset $\Delta F_{OS1}$ with the overall power $OP_{T1}$ being a parameter, and sets band-stop cutoff frequencies $F_{1L}$, $F_{1U}$ ($F_{1L}=F_{V1}-\Delta F_{OS1}$, $F_{1U}=F_{V1}+\Delta F_{OS1}$) for the primary vibration in step S57. After the step S57, the flow goes to step S59.

Note that when $F_{1L}=F_{1U}=F_a$, the band-stop filter computation unit 202f does not perform band-stop filtering on the frequency $F_a$.

When the flow goes to the step S58 from the step S54, the unbalance wheel vibration detection unit 214 sets $F_{1L}=F_{1U}=F_a$, and the flow goes to the step S59.

The unbalance wheel vibration detection unit 214 checks whether or not there is power of the secondary vibration greater than or equal to a predetermined threshold in step S59. When there is power of the secondary vibration greater than or equal to the predetermined threshold (step S59: YES), the flow goes to step S60, and when there is no such power (step S59: NO), the flow goes to step S63.

In the step S60, the unbalance wheel vibration detection unit 214 detects the power peak of the secondary vibration frequency $F_{V2}$, and calculates overall power $OP_{T2}$ within a predetermined frequency window. Next, in step S61, the unbalance wheel vibration detection unit 214 acquires a frequency offset $\Delta F_{OS2}$ with reference to the overall power $OP_{T2}$ based on, for example, a lookup table or a function (see FIG. 22B), stored in the flash memory of the microcomputer 113 (see FIG. 16) beforehand and for setting the frequency offset $\Delta F_{OS2}$, with the overall power $OP_{T2}$ being a parameter, and sets band-stop cutoff frequencies $F_{2L}$, $F_{2U}$ ($F_{2L}=F_{V2}-\Delta F_{OS2}$, $F_{2U}=F_{V2}+\Delta F_{OS2}$). After the step S62, the flow goes to step S64.

When the flow goes to the step S63 from the step S59, the unbalance wheel vibration detection unit 214 sets $F_{2L}=F_{2U}=F_{a2}$ (where $F_{a2} \gg F_a$), and the flow goes to the step S64.

Note that when $F_{2L}=F_{2U}=F_{a2}$, the band-stop filter computation unit 202f does not perform band-stop filtering on the frequency $F_{a2}$.

The damper control unit 202' calculates the motor control amount for the electric damper conversion mechanism of each wheel 1 and drives FETs.

The control flow in the step S64 is the same as that shown in the flowchart of FIG. 12. In the third embodiment, however, the steps S22, S23, and S24 are replaced with a single step in which "the band-stop filter computation unit 202f performs band-stop filtering on the primary vibration frequency $F_{V1}$, and the secondary vibration frequency $F_{V2}$ using the cutoff frequencies $F_{1L}$ and $F_{1U}$ and the cutoff frequencies $F_{2L}$ and $F_{2U}$, in accordance with the signal of a displacement rate $S_V$ as needed, and calculates a filtered displacement rate $S3_F$".

Figure 24:
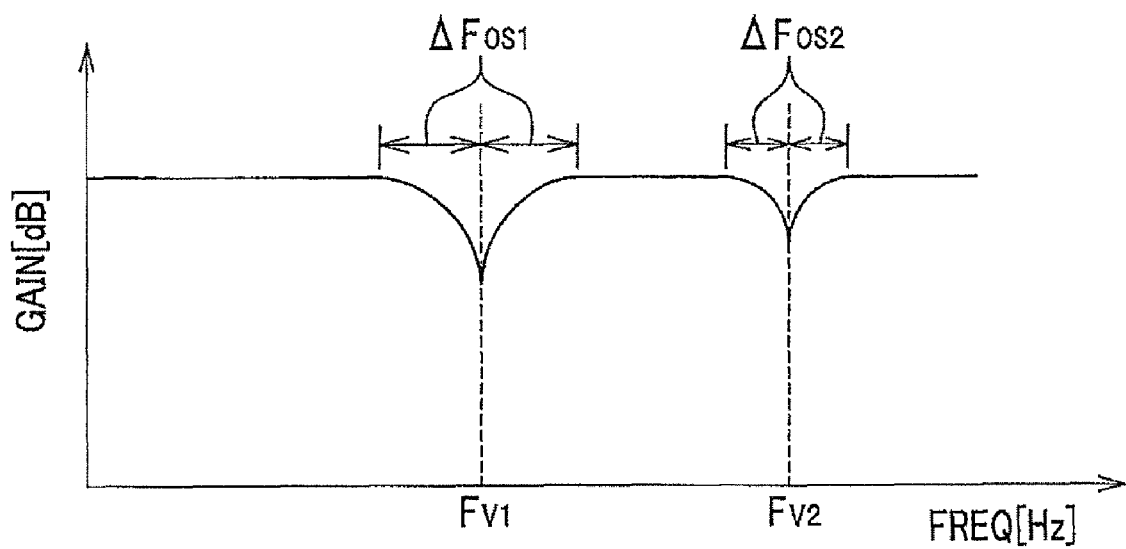
FIG. 24 is a diagram showing the frequency characteristic of a signal having undergone digital band-stop filtering.

A frequency characteristic shown in FIG. 24 can be obtained through the band-stop filtering. The larger the frequency offset $\Delta F_{OS1}$ is, the smaller the gain of the primary vibration frequency $F_{V1}$ becomes. Likewise, the larger the frequency offset $\Delta F_{OS2}$ is, the smaller the gain of the secondary vibration frequency $F_{V2}$ becomes.

As explained above, according to the third embodiment, with respect to the secondary vibration of unbalance wheel vibration, it is possible to control the damper characteristic so as not to transmit such vibration to the vehicle body 6.

Moreover, it is possible to flexibly set the frequency for setting the damper damping force weak and the level of weakening the damping force by detecting the frequencies $F_{V1}$ and $F_{V2}$ of the respective primary vibration and secondary vibration of unbalance wheel vibration contained in a steering wheel torque detection signal $S_T$, in comparison with the second embodiment.

Note that the order of vibration may be increased as needed.

Even if the electric damper 303 is set to have a hard ride comfort which is particularly proper for sporty vehicles, it is possible to suppress any transmission of unbalance wheel vibration to a vehicle body.

The invention claimed is:

1. An electric damper comprising:
   a conversion unit that converts a vertical motion of a wheel into a rotation of an electric motor;
   a wheel vertical motion detector that detects a vertical motion of the wheel; and
   a damping unit that controls the electric motor based on a signal from the wheel vertical motion detector to change damping force to damp vibration of a vertical motion of the wheel in a predetermined frequency band between a first predetermined frequency and a second predetermined frequency greater than the first predetermined frequency, wherein
   the damping unit sets, in accordance with a vehicle speed, the predetermined frequency band in which the damping force is changed.

2. The electric damper according to claim 1, wherein the electric damper is mounted on a vehicle including an electric power steering device including a steering wheel torque sensor; and wherein the damping unit detects a magnitude of vibration corresponding to the predetermined frequency band based on a steering wheel torque detection signal from the steering wheel torque sensor, and changes the damping force based on the detected magnitude.

3. The electric damper according to claim 1, wherein the electric damper is mounted on a vehicle including an electric power steering device including a steering wheel torque sensor; and wherein the damping unit detects a frequency of a vibration component originating from unbalancing of the wheel based on a steering wheel torque detection signal from the steering wheel torque sensor, and changes the damping force based on the detected frequency.

4. The electric damper according to claim 1, wherein the electric damper is mounted on a vehicle including an electric power steering device including a steering wheel torque sensor;

the electric damper further comprising:

a power spectrum computation unit that computes a power spectrum of a steering wheel torque detection signal from the steering wheel torque sensor of the electric power steering device; and an unbalance wheel vibration frequency acquiring unit that acquires a frequency of a vibration component caused by unbalance in the wheel, and a magnitude of the vibration in accordance with a vehicle speed from computation results of the power spectrum computation unit; and the damping unit sets the predetermined frequency band based on the frequency of the vibration component acquired by the unbalance wheel vibration frequency acquiring unit, and changes the damping force in the predetermined frequency band based on the magnitude of the vibration component originating from unbalancing of the wheel.

5. The electric damper as claimed in claim 1, wherein the predetermined frequency band is a frequency band of the vertical motion of the wheel caused by unbalance vibration of the wheel.

\* \* \* \* \*